United States Patent
Kaminaga et al.

(10) Patent No.: US 12,534,585 B2
(45) Date of Patent: Jan. 27, 2026

(54) GAS BARRIER FILM AND METHOD FOR PRODUCING THE SAME

(71) Applicant: TOPPAN INC., Tokyo (JP)

(72) Inventors: Junichi Kaminaga, Tokyo (JP); Ryo Takei, Tokyo (JP); Yoshiki Koshiyama, Tokyo (JP); Takeshi Nishikawa, Tokyo (JP); Miki Fukugami, Tokyo (JP); Ayumi Tanaka, Tokyo (JP); Takayuki Yanagisawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 649 days.

(21) Appl. No.: 17/899,507

(22) Filed: Aug. 30, 2022

(65) Prior Publication Data

US 2022/0411598 A1     Dec. 29, 2022

Related U.S. Application Data

(63) Continuation of application No. PCT/JP2020/049021, filed on Dec. 25, 2020.

(30) Foreign Application Priority Data

Mar. 5, 2020   (JP) .................................. 2020-038062
Mar. 19, 2020  (JP) .................................. 2020-050180

(51) Int. Cl.
*C08J 7/048*   (2020.01)
*C08J 5/18*    (2006.01)
(Continued)

(52) U.S. Cl.
CPC ............. *C08J 7/048* (2020.01); *C08J 5/18* (2013.01); *C08J 7/0423* (2020.01); *C09D 7/63* (2018.01);
(Continued)

(58) Field of Classification Search
None
See application file for complete search history.

(56) References Cited

U.S. PATENT DOCUMENTS 5,981,029 A   11/1999   Harada et al.
6,083,605 A    7/2000   Harada et al.
(Continued)

FOREIGN PATENT DOCUMENTS

JP   H09-150484 A    6/1997
JP   H10-264292 A   10/1998
(Continued)

OTHER PUBLICATIONS

International Search Report mailed Apr. 6, 2021 for International Application No. PCT/JP2020/049021, with English translation, 7 pages.

*Primary Examiner* — Yan Lan
(74) *Attorney, Agent, or Firm* — Squire Patton Boggs (US) LLP

(57) ABSTRACT

A gas barrier film comprising a resin base material, an oxygen barrier coating provided on at least one surface of the resin base material, and a base layer and/or an inorganic oxide layer provided between the resin base material and the oxygen barrier coating, wherein the black area ratio of one surface measured by the following measuring method is 0.15% or less: <Measuring method> An arbitrary region of 1281 μm square on one surface of a resin base material is photographed with an optical microscope to acquire a photographed image of 1024×1024 pixels, the photographed image is converted into a monochrome image of 256 gradations using an image analysis software, and the value obtained by subtracting 30 from the most frequent value of the luminance in the monochrome image is set as the threshold, the value less than the threshold is set to black, and the value not less than the threshold is set to white, thus (Continued)

binarizing the luminance, and the ratio of the total area of the black regions having a size of 100 μm² or more in the 1281 μm square region is defined as the black area ratio.

20 Claims, 5 Drawing Sheets

(51) Int. Cl.
    *C08J 7/04*         (2020.01)
    *C09D 7/63*         (2018.01)
    *C09D 183/16*     (2006.01)

(52) U.S. Cl.
    CPC ......... *C09D 183/16* (2013.01); *C08J 2323/12* (2013.01); *C08J 2483/16* (2013.01)

(56) References Cited

U.S. PATENT DOCUMENTS

| | | | |
|---|---|---|---|
| 6,979,493 B2 * | 12/2005 | Uchida | C08J 5/18 428/425.5 |
| 2005/0131162 A1 | 6/2005 | Tanaka et al. | |
| 2014/0370270 A1 | 12/2014 | Kaminaga et al. | |
| 2016/0040035 A1 | 2/2016 | Omura et al. | |
| 2018/0009206 A1 | 1/2018 | Murase et al. | |
| 2020/0331024 A1 | 10/2020 | Okamura et al. | |

FOREIGN PATENT DOCUMENTS

| | | |
|---|---|---|
| JP | 2000-254994 A | 9/2000 |
| JP | 2001-048994 A | 2/2001 |
| JP | 2001-316489 A | 11/2001 |
| JP | 2002-052670 A | 2/2002 |
| JP | 2002-321301 A | 11/2002 |
| JP | 2002-370277 A | 12/2002 |
| JP | 2003-154596 A | 5/2003 |
| JP | 2004-261987 A | 9/2004 |
| JP | 2005-255761 A | 9/2005 |
| JP | 2005-274256 A | 10/2005 |
| JP | 2008-023927 A | 2/2008 |
| JP | 4373797 B2 | 11/2009 |
| JP | 2010-018302 A | 1/2010 |
| JP | 2011-148139 A | 8/2011 |
| JP | 2012-240222 A | 12/2012 |
| JP | 2012-250470 A | 12/2012 |
| JP | 2013-022918 A | 2/2013 |
| JP | 2013-064060 A | 4/2013 |
| JP | 2014-218090 A | 11/2014 |
| JP | 2016-196159 A | 11/2016 |
| JP | 2017-013473 A | 1/2017 |
| JP | 6176239 B2 | 8/2017 |
| JP | 6191221 B2 | 9/2017 |
| JP | 2017-222151 A | 12/2017 |
| JP | 2018-012267 A | 1/2018 |
| JP | 2019-127027 A | 8/2019 |
| JP | 2019-150994 A | 9/2019 |
| JP | 2019-151004 A | 9/2019 |
| JP | 2019-195936 A | 11/2019 |
| WO | WO2009/081715 A1 | 5/2011 |
| WO | WO2014/163039 A1 | 2/2017 |
| WO | WO 2017/169952 A1 | 10/2017 |
| WO | WO2016/158794 A1 | 1/2018 |

* cited by examiner

GAS BARRIER FILM AND METHOD FOR PRODUCING THE SAME

CROSS REFERENCE TO RELATED APPLICATION

This application is a bypass continuation application of International Application No. PCT/JP2020/049021 filed on Dec. 25, 2020, claiming the priority based on Japanese Patent Application No. 2020-038062 filed on Mar. 5, 2020 and Japanese Patent Application No. 2020-050180 filed on Mar. 19, 2020. The disclosures in these applications are incorporated in the present specification by reference.

BACKGROUND

Field

The present disclosure relates to a gas barrier film and a method for producing the same.

Description of the Related Art

Packaging materials used for packaging foods, pharmaceuticals, and the like are required to have a property of preventing the ingress of gases (water vapor, oxygen, etc.) that denature the contents, that is, a gas barrier property, in order to suppress deterioration, rotting or the like of the contents and maintain their functions and qualities. Therefore, film materials having a gas barrier property (gas barrier film) are used as these packaging materials.

As the gas barrier film, a film in which a gas barrier layer made of a material having a gas barrier property is provided on the surface of a resin base material is known. As the gas barrier layer, a metal foil, a metal vapor-deposited coating, and a coating formed by a wet coat method are known. As the coating which exhibits an oxygen barrier property, a resin coating formed of a coating agent containing a resin such as a water-soluble polymer, polyvinylidene chloride, and the like, and an inorganic layered mineral composite resin coating formed of a coating agent containing a water-soluble polymer and an inorganic layered mineral are known (Japanese Patent No. 6191221). Further, as the gas barrier layer, a gas barrier layer in which a vapor-deposited thin coating layer made of an inorganic oxide and a gas barrier composite coating containing an aqueous polymer, an inorganic layered compound and a metal alkoxide are sequentially laminated (Japanese Laid-Open Patent Publication No. 2000-254994), and a gas barrier layer containing a polyvalent metal salt of a carboxylic acid, which is a reaction product of a carboxy group of a polycarboxylic acid-based polymer and a polyvalent metal compound (Japanese Patent No. 4373797), have been proposed.

In order to improve the gas barrier property, for example, a gas barrier film has been proposed in Japanese Laid-Open Patent Publication No. H9-150484 in which a coating is formed on at least one surface of a base material, and the surface roughness parameter Rt/Ra on the surface of the coating is 20 or less. Here, Rt is the distance between the maximum peak and the deepest valley of the surface roughness curve. Ra is the center line average roughness. According to the gas barrier film of Japanese Laid-Open Patent Publication No. H9-150484, the gas barrier property is improved.

SUMMARY

However, the oxygen barrier property of a gas barrier film having a coating formed on the surface of a resin base material by a wet coat method, a vapor deposition method or a sputtering method may not be stable depending on the production lot. Specifically, the oxygen barrier property of the gas barrier film may be inferior to the original oxygen barrier property, that is, the oxygen barrier property assumed from the material constituting the coating and the thickness of the coating. In particular, when the thickness of the coating becomes thin, such a problem tends to occur easily. Therefore, it is necessary to make the thickness of the gas barrier layer thicker than necessary, which causes problems of poor productivity and excessive material cost.

In addition, printing may be performed on the surface of a gas barrier film. Therefore, the gas barrier film is required to be easy to print on the surface (to have printability).

The present disclosure has been made in view of the above circumstances and has an object of providing a gas barrier film which, even if the thickness of the coating for imparting an oxygen barrier property is thin, exhibits sufficiently the original oxygen barrier property to show an excellent gas barrier property, and has good printability, and a method for producing the same.

The gas barrier film according to the present disclosure comprises a resin base material, an oxygen barrier coating provided on at least one surface of the resin base material, and one or both of a base layer and an inorganic oxide layer provided between the resin base material and the oxygen barrier coating, wherein one surface of the resin base material has a black area ratio of 0.15% or less as measured by the following measuring method.
<Measuring Method>

An arbitrary region of 1281 µm square on one surface of a resin base material is photographed with an optical microscope to acquire a photographed image of 1024×1024 pixels, the photographed image is converted into a monochrome image of 256 gradations using an image analysis software, and the value obtained by subtracting 30 from the most frequent value of the luminance in the monochrome image is set as the threshold, the value less than the threshold is set to black, and the value not less than the threshold is set to white, thus binarizing the luminance, and the ratio of the total area of the black regions having a size of 100 $\mu m^2$ or more in the 1281 µm square region is defined as the black area ratio.

The method for producing a gas barrier film according to the present disclosure comprises a step of measuring the black area ratio on the surface of a resin base material by the above-described measuring method, and preparing a resin base material having the black area ratio on at least one surface of 0.15% or less as the resin base material, and a step of applying a coating agent to at least one surface of the resin base material to form at least the oxygen barrier coating.

According to the gas barrier film of the present disclosure, even if the thickness of the oxygen barrier coating is thin, there is little variation in performances between production lots, and the original oxygen barrier property is stably exhibited, as a result, an excellent gas barrier property can be manifested, and the printability can be improved.

These and other objects, features, aspects, and effects of the present invention will be further clarified from the following detailed description in light of the accompanying drawings.

DETAILED DESCRIPTION

Embodiment 1

In order to investigate the cause of the above problem, the present inventors have observed the surface and cross section of the gas barrier film having a poor oxygen barrier property in detail with an optical microscope or an electron microscope. As a result of cross-sectional electron microscopic observation with a focused ion/electron beam processing observation device at the location where the antiblocking agent (hereinafter, also referred to as "AB agent") added to prevent blocking of the resin base material is present, it was confirmed that a defect having a width of several μm occurred in the coating at the portion where the AB agent protruded high. It is considered that this defect became a path for gas permeation and the oxygen barrier property was not sufficiently developed.

On the surface of the resin base material, there are convex portions of various sizes due to the AB agent. It is believed that the protrusion height and protrusion density of the AB agent vary depending on the production lot of the resin base material, and when the surface of the resin base material is coated with the gas barrier film, the coating is not formed locally at the position of the large convex portion, and a defect occurs and the oxygen barrier property becomes unstable.

In addition, it was confirmed, by observing the transfer failure of fine dots (sometimes referred to as dot missing) occurring in the highlight printing part of the gas barrier film under a microscope in detail, that dot missing is likely to occur at a portion where the AB agent is highly projected.

Then, the present inventors have devised a method for accurately grasping a wide range of surface conditions of a resin base material, which affects the oxygen barrier property and printability of a gas barrier film, in a short time, and found that the oxygen barrier performance is excellent and the printability on the gas barrier film becomes good when the optical microscopic image on the surface of the resin base material is binarized and the ratio of the total area of the black regions of 100 μm$^2$ or more (hereinafter, referred to as the black area ratio) is 0.15% or less, leading to the present disclosure.

The gas barrier film of the present disclosure will be described with reference to embodiments.

Figure 1:
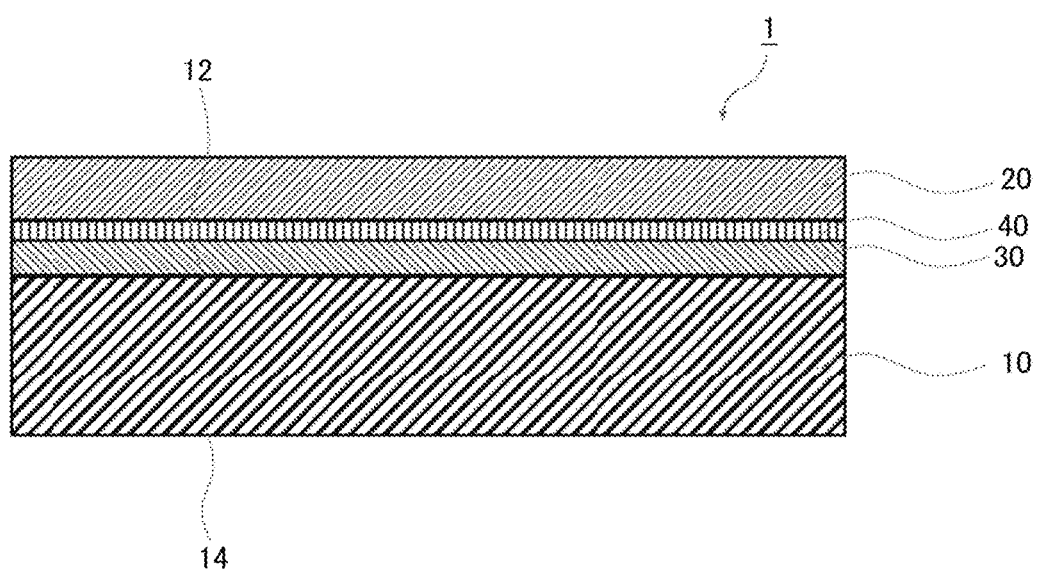
FIG. 1 is a cross-sectional view of the gas barrier film of Embodiment 1.

FIG. 1 is a schematic cross-sectional view of the gas barrier film 1 according to Embodiment 1. The dimensional ratio in FIG. 1 is different from the actual one for convenience of explanation.

The gas barrier film 1 has a resin base material 10, a base layer 30, an inorganic oxide layer 40, and an oxygen barrier coating 20. Either the base layer 30 or the inorganic oxide layer 40 may be omitted.

The base layer 30 is laminated in contact with one surface 12 of the resin base material 10, and the inorganic oxide layer 40 is laminated on the surface opposite to the surface of the base layer 30 in contact with the resin base material 10. The inorganic oxide layer 40 is laminated in contact with the base layer 30, and the oxygen barrier coating 20 is located in contact with the surface opposite to the surface of the inorganic oxide layer 40 in contact with the base layer 30. When the base layer 30 is not provided, the inorganic oxide layer 40 is laminated on one surface 12 of the resin base material 10. When the inorganic oxide layer 40 is not provided, the oxygen barrier coating 20 is laminated on the base layer 30.

<Resin Base Material>

The resin base material 10 contains a resin. The resin constituting the resin base material 10 includes, for example, olefin-based resins such as polyethylene, polypropylene, polymers of olefins having 2 to 10 carbon atoms, propylene-ethylene copolymers, and the like; polyester-based resins such as polyethylene terephthalate, polybutylene terephthalate, polyethylene naphthalate, and the like; aliphatic polyamides such as nylon 6, nylon 66, and the like; polyamide-based resins such as aromatic polyamides such as polymetaxylylene adipamide, and the like, etc.; vinyl-based resins such as polystyrene, polyvinyl acetate, ethylene-vinyl acetate copolymer, polyvinyl alcohol, ethylene-vinyl alcohol copolymer, and the like; acrylic resins such as homopolymers or copolymers of (meth)acrylic monomers such as polymethyl methacrylate, polyacrylonitrile, and the like, etc.; cellophane; engineering plastics such as polycarbonates, polyimides, and the like; etc. These resins may be used alone or in combination of two or more.

The resin base material 10 includes a single-layer film composed of a single resin, a single-layer or laminated film using a plurality of resins, and the like. Further, a laminated base material obtained by laminating the above resin on another base material (metal, wood, paper, ceramics, etc.) may be used. The resin base material 10 may be composed of a single layer or two or more layers. As the resin base material 10, polyolefin-based resin films (particularly polyethylene films, polypropylene films, etc.), polyester-based resin films (particularly polyethylene terephthalate-based resin films), polyamide-based resin films (particularly nylon films), and the like are preferable.

The resin base material 10 may be an unstretched film or a uniaxially or biaxially stretched oriented film. As the resin base material 10, a polyethylene film or a polypropylene film is preferable, and a biaxially stretched polypropylene film (OPP) is particularly preferable, from the viewpoint of an excellent water vapor barrier property. The OPP may be a film processed from at least one polymer selected from homopolymers, random copolymers and block copolymers. Homopolymers are polypropylenes consisting of only elemental propylene. The random copolymer is polypropylene in which propylene, which is the main monomer, and a small amount of comonomer different from propylene are randomly copolymerized to form a homogeneous phase. The block copolymer is polypropylene that forms an inhomogeneous phase by copolymerizing propylene, which is the main monomer, with the above-mentioned comonomer in a block-like manner or polymerizing them in a rubber-like manner. When the resin base material 10 is made of OPP, the OPP may form one layer or two or more layers.

One surface 12 of the resin base material 10 may be subjected to the surface treatment such as a chemical treatment, a solvent treatment, a corona treatment, a low temperature plasma treatment, an ozone treatment, and the like in order to improve the close adhesion to the base layer 30 and the inorganic oxide layer 40.

The resin base material 10 may contain additives such as a filler, an antiblocking agent, an antistatic agent, a plasticizer, a lubricant, an antioxidant, and the like. Any one of these additives may be used alone, or two or more of them may be used in combination.

When the resin base material 10 contains an anti-blocking agent (hereinafter, also referred to as "AB agent"), unevenness derived from the AB agent is formed on one surface 12 of the resin base material 10. By containing the AB agent, the resin base material 10 can impart convexity to the surface of the resin base material 10 and suppress the occurrence of blocking of the film. That is, the blocking resistance of the film can be enhanced by containing the AB agent in the resin base material 10. Therefore, the film can be easily wound up and the processing characteristics of the film can be improved. Therefore, the resin base material 10 preferably contains an AB agent. On the other hand, when a large convex portion is formed on one surface 12 of the resin base material 10, a defect forming a path for gas permeation is likely to occur in the base layer 30, the inorganic oxide layer 40, and the oxygen barrier coating 20 to be formed thereon. Therefore, there is a possibility that the oxygen barrier property of the gas barrier film 1 will decrease.

When the resin base material 10 contains the AB agent, the AB agent is dispersed in the resin base material 10. On one surface 12 or the other surface 14 of the resin base material 10, there are a plurality of protrusions locally derived from the AB agent. On one surface 12 and the other surface 14, the AB agent may be exposed or may be covered with a resin.

The AB agent is made of solid particles, and includes organic particles, inorganic particles, and the like. The organic particles include polymethyl methacrylate particles, polystyrene particles, polyamide particles, and the like. These organic particles can be obtained by, for example, emulsion polymerization, suspension polymerization, and the like. The inorganic particle includes silica particles, zeolite, talc, kaolinite, feldspar, and the like. Any one of these AB agents may be used alone, or two or more of them may be used in combination.

Considering the appearance, transparency, the possibility of the AB agent of falling off, and the anti-blocking performance of the gas barrier film 1, the average particle size of the AB agent is, for example, preferably 0.1 to 5 μm. The average particle size of the AB agent is a weight average diameter measured by the Coulter method.

When the resin base material 10 contains an AB agent, the content of the AB agent is, for example, preferably 0.05 to 0.5 part by mass with respect to 100 parts by mass of the resin constituting the resin base material 10. When the content of the AB agent is at least the lower limit value described above, it is easy to improve the processing characteristics of the film which is the raw material of the resin base material 10. When the content of the AB agent is not more than the above upper limit value, it is easy to suppress the deterioration of the oxygen barrier property of the gas barrier film 1.

The black area ratio of one surface 12 of the resin base material 10 is 0.15% or less, more preferably 0.12% or less, still more preferably 0.10% or less. When the black area ratio is not more than the above upper limit value, the oxygen barrier property of the gas barrier film 1 is more likely to be improved. In addition, when the black area ratio is not more than the above upper limit value, it is easy to improve the printability of the gas barrier film 1 using, specifically, a polypropylene film or a polyethylene terephthalate-based resin film. The lower limit value of the black area ratio is not particularly limited and is 0% or more.

Here, "improving printability" means to suppress ink missing (sometimes referred to as dot missing) in the highlight portion (printed portion having low halftone dot area ratio) when gravure printing is performed on the oxygen barrier coating 20 of the gas bather film. The black area ratio can be adjusted, for example, by the material, average particle size and content of the AB agent contained in the resin base material 10, the characteristics of a resin forming one surface 12 of the resin base material 10, the film production conditions, and the like.

When the luminance of the surface of the resin base material 10 is binarized and the portion (black spot) that looks black is observed with an electron microscope, protrusions are present. There is a tendency that the larger the size of the black spot, the relatively higher the height of the protrusion, and in particular, coating film defects of the oxygen barrier coating and ink omission in printing are likely to occur at locations where black spots (protrusions) having a size of 100 μm$^2$ or more are present. That is, if the black area ratio is smaller, the number of the protrusions which adversely affect the oxygen barrier property and the printability on one surface 12 of the resin base material 10 is smaller, the oxygen barrier property of the gas barrier film 1 is more improved, and the printability can be improved.

The black area ratio in the present specification can be measured by the following measuring method.

<Measuring Method>

An arbitrary region of 1281 μm square on one surface 12 of the resin base material 10 is photographed with an optical microscope, and a photographed image of 1024×1024 pixels is acquired. An example of the photographed image is shown in FIG. 2.

Figure 2:
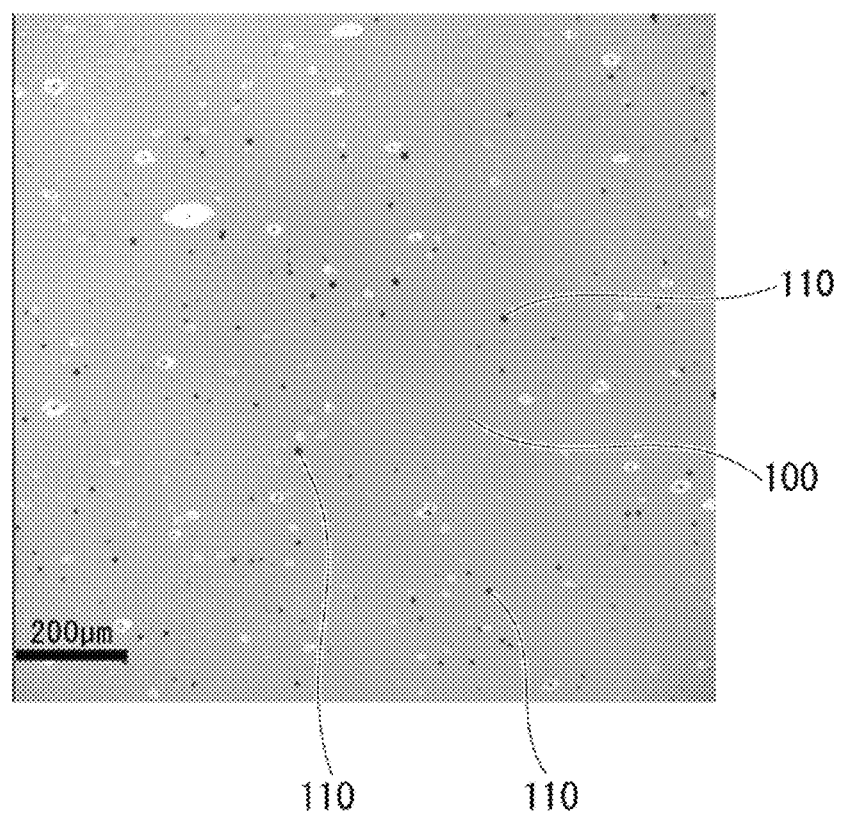
FIG. 2 is a photographed image of one surface of the resin base material of Embodiment 1 taken with an optical microscope.

FIG. 2 is a photographed image of one surface 12 of the resin base material 10 taken with an optical microscope. In FIG. 2, 100 represents a flat portion and 110 represents a protrusion. The protrusion 110 includes, for example, foreign matters, AB agent, undissolved resin, and the like. As shown in FIG. 2, the flat portion 100 looks gray and the protrusion 110 looks black. The luminance of the flat portion 100 corresponds to the most frequent value of the luminance described later.

Next, using an image analysis software, the acquired 1024×1024 pixels photographed image is converted into a 256-gradation monochrome image. A histogram is created by plotting the luminance distribution in the converted monochrome image. An example of the histogram is shown in FIG. 3.

Figure 3:
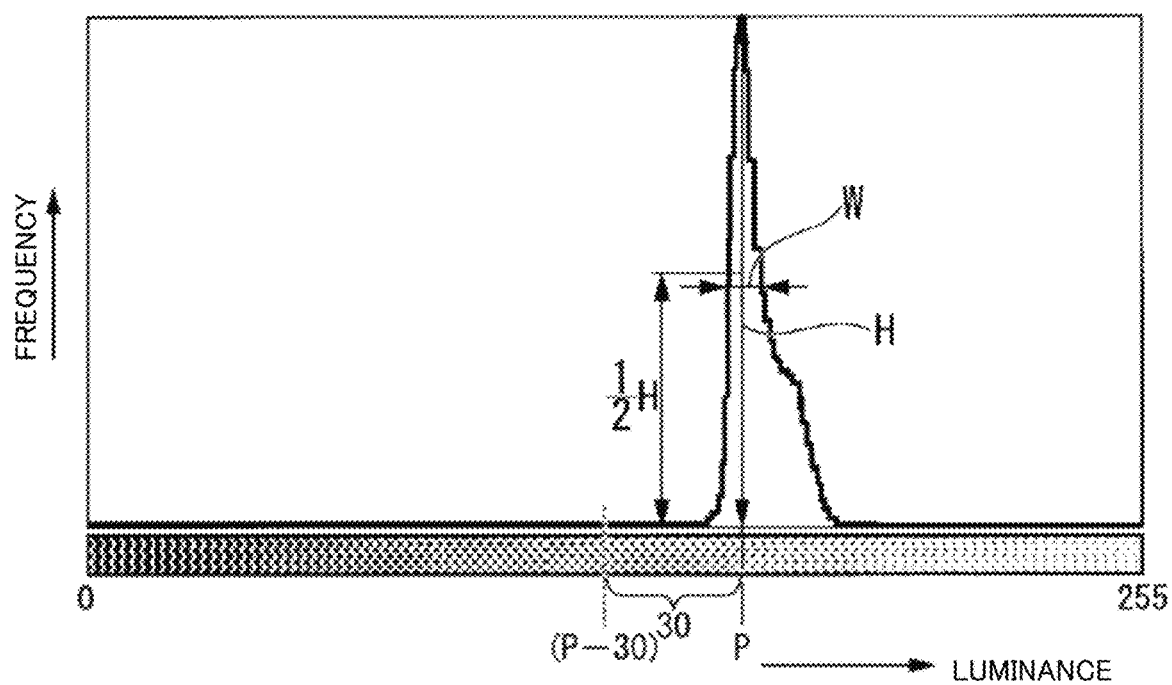
FIG. 3 is an example of the histogram used when calculating the black area ratio.

In FIG. 3, the horizontal axis represents the luminance converted into a monochrome image having 256 gradations. The luminance in the monochrome image is expressed as an integer from 0 to 255. The vertical axis represents the frequency of the luminance. In FIG. 3, the minimum value of the distributed luminance is 26, and the maximum value is 255. The most frequent value of the luminance is the value of the luminance that is most distributed in the monochrome image. P in FIG. 3 represents the most frequent valuer of the luminance. In FIG. 3, P=160.

Next, the value obtained by subtracting 30 from the most frequent value of the luminance is set as the threshold, the value below the threshold is set to black, and the value above the threshold is set to white, and the luminance in a monochrome image is binarized. In the monochrome image of FIG. 3, the threshold at the boundary between black and white is a value (P−30) obtained by subtracting 30 from the most frequent value of the luminance. In FIG. 3, the threshold is 130. That is, in FIG. 3, the binarization process is performed with the luminance less than 130 as "black" and the luminance of 130 or more as "white".

From the viewpoint of improving the accuracy of the value of the black area ratio, it is preferable that the luminance histogram of the acquired image has a sharp shape. Here, the "sharp shape" can be determined, for example, by the size of the width W (hereinafter, also referred to as "half width") of the histogram at half the height (H/2) of the peak height H at the most frequent value P of the histogram. The half width W is, for example, preferably 30 or less, more preferably 20 or less, still more preferably 10 or less. When the half width W is equal to or less than the above upper limit value, the histogram has a sharp shape and the accuracy of the value of the black area ratio can be improved. The lower limit of the half width W is not particularly limited, but is substantially 2 or more.

Based on the binarized 1281×1281 μm (1024×1024 pixels) image, the ratio of the total area of the black regions having a size of 100 μm$^2$ or more is defined as the black area ratio. Further, the black area ratio is an arithmetic mean value of the values obtained in any three regions.

As the optical microscope, an optical microscope "OLS-4000" manufactured by Olympus Corporation is preferable. As the image analysis software, Scion's "Scion ImageJ" is preferred.

The image acquisition conditions will be described.
(Image Acquisition Conditions)

The side (one side 12) to which a coating agent is applied of the resin base material 10 for which the black area ratio is to be determined is turned up, and the resin base material 10 is attached on a slide glass using a black film double-sided tape (7694, manufactured by Teraoka Seisakusho Co., Ltd.). Using an optical microscope (OLS-4000, manufactured by Olympus Corporation), an objective lens (MP-FLN10) with a magnification of 10 times is used to capture an image with a range of 1281 μm×1281 μm from any three points of the resin base material 10 on the slide glass as an image of 1024×1024 pixels. The amount of light when taking an image is arbitrary, but it is preferable to adjust the amount of light so that the most frequent value of the image luminance is within the range of 80 to 200 at 256 gradations.

The image analysis conditions are as follows.
(Image Analysis Conditions)
Discard color information: 8 bits
Binarization threshold: A value obtained by subtracting 30 from the most frequent value of luminance
Scale setting: Set Scale Distance in pixel: 1024, Known distance: 1281, Unit of length: μm
Area measurement: Analyze Particles Size: check 100-Infinity (μm$^2$), Include Holes, and Summarize Under the above image analysis conditions, % Area values are calculated for each of the photographed images acquired from any three locations of the resin base material 10, and the arithmetic mean value of these % Area values is defined as the black area ratio.

The black area ratio in the present specification is calculated by observing one surface 12 of the resin base material 10 in a plane. Therefore, as compared with the conventional measurement of surface roughness, the surface condition can be observed in a plane instead of a line.

Conventional surface roughness values vary depending on the method and range of measurement. If the measurement area is small, the roughness may be underestimated because a small number of protrusions are not measured. Further, even when measuring the roughness in a straight line range of a certain length, such as the center line average roughness, if a large protrusion is measured, the roughness will be overestimated, but if not, the roughness will be underestimated after all.

By defining the state of the surface of the resin base material by the black area ratio as described in the present specification, it is possible to evaluate the state of the surface of the resin base material with reducing the variation in the state of the surface of the resin base material. Therefore, the variation in the oxygen barrier property can be suppressed, and the oxygen barrier property of the gas barrier film 1 can be more easily improved.

The management of the black area ratio by the binarization process of an optical microscopic image is suitable for the means for managing the oxygen bather property and printability because the measurement range is wide and protrusions can be found by a simple method.

The thickness of the resin base material 10 is not particularly limited, and is appropriately selected depending on the price and application while considering the suitability as a packaging material and the suitability for laminating other coatings. The thickness of the resin base material 10 is practically preferably 3 μm to 200 μm, more preferably 5 μm to 120 μm, further preferably 6 μm to 100 μm, and particularly preferably 10 μm to 30 μm.

<Base Layer>

The base layer 30 is provided between the resin base material 10 and the inorganic oxide layer 40 or the oxygen bather coating 20.

The base layer 30 is a layer containing an organic polymer as the main component, and is sometimes referred to as a primer layer. By providing the base layer 30, the film formation property and the close adhesion strength of the inorganic oxide layer 40 or the oxygen barrier coating 20 can be improved.

The content of the organic polymer in the base layer 30 may be, for example, 70% by mass or more, or 80% by mass or more. The organic polymer includes, for example, polyacrylic resins, polyester resins, polycarbonate resins, polyurethane resins, polyamide resins, polyolefin resins, polyimide resins, melamine resins, phenol resins, and the like, and considering the hot water resistance of the close adhesion strength between the resin base material 10 and the inorganic oxide layer 40 or the oxygen barrier coating 20, it is preferable to contain at least one of a polyacrylic resin, a polyol-based resin, a polyurethane-based resin, a polyamide-based resin, or a reaction product of these organic polymers. Further, the base layer 30 may contain a silane coupling agent, an organic titanate or a modified silicone oil.

More preferably, the organic polymer includes an organic polymer having a urethane bond generated by a reaction between a polyol having two or more hydroxyl groups at the end of the polymer and an isocyanate compound, and/or, an organic polymer containing a reaction product of a polyol having two or more hydroxyl groups at the end of the polymer and an organic silane compound such as a silane coupling agent or a hydrolyzate thereof.

The polyols include, for example, at least one selected from acrylic polyols, polyvinyl acetals, polystyryl polyols, polyurethane polyols, and the like. The acrylic polyol may be obtained by polymerizing an acrylic acid derivative monomer, or may be obtained by copolymerizing an acrylic acid derivative monomer with another monomer. The acrylic acid derivative monomer includes, for example, ethyl methacrylate, hydroxyethyl methacrylate, hydroxypropyl methacrylate, hydroxybutyl methacrylate, and the like. The monomer to be copolymerized with the acrylic acid derivative monomer includes, for example, styrene, and the like.

The isocyanate compound has an effect of enhancing the close adhesion between the resin base material 10 and the inorganic oxide layer 40 or the oxygen barrier coating 20 by a urethane bond generated by reacting with a polyol. That is, the isocyanate compound functions as a cross-linking agent or a curing agent. The isocyanate compound includes, for example, monomers such as aromatic tolylene diisocyanate (TDI) and diphenylmethane diisocyanate (MDI), aliphatic xylene diisocyanate (XDI), hexamethylene diisocyanate (HMDI) and isophorone diisocyanate (IPDI), and the like; and polymers thereof; and derivatives thereof. The above-mentioned isocyanate compounds may be used alone or in combination of two or more.

The silane coupling agent includes, for example, vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyldimethoxysilane, and the like. The organic silane compound may be a hydrolyzate of these silane coupling agents. The organic silane compound may contain one of the above-mentioned silane coupling agents and hydrolyzates thereof alone or may contain them in combination of two or more.

The base layer 30 can be formed by blending the above-mentioned components in an organic solvent at an arbitrary ratio to prepare a mixed solution, and applying the mixed solution prepared on one surface 12 of the resin base material 10. The mixed solution may contain, for example, a curing accelerator such as a tertiary amine, an imidazole derivative, a carboxylic acid metal salt compound, a quaternary ammonium salt, a quaternary phosphonium salt, and the like; an antioxidant such as a phenol-based, sulfur-based or phosphite-based antioxidant, and the like; a leveling agent; a flow regulator; a catalyst; a cross-linking reaction accelerator; a filler, and the like.

The mixed solution can be coated on the resin base material 10 using well-known printing methods such as an offset printing method, a gravure printing method, a silk screen printing method, and the like, or well-known application methods such as roll coat, knife edge coat, gravure coat, and the like. After coating, the base layer 30 can be formed by heating to, for example, 50 to 200° C., and drying and/or curing.

The thickness of the base layer 30 is not particularly limited and may be, for example, 0.005 to 5 μm. The thickness may be adjusted according to the application or the required characteristics. The thickness of the base layer 30 is preferably 0.01 to 1 μm, more preferably 0.01 to 0.5 μm. When the thickness of the base layer 30 is 0.01 μm or more, sufficient close adhesion strength between the resin base material 10 and the inorganic oxide layer 40 or the oxygen barrier coating 20 can be obtained, and the oxygen barrier property is also good. When the thickness of the base layer 30 is 1 μm or less, it is easy to form a uniform coated surface, and the drying load and the producing cost can be suppressed.

<Inorganic Oxide Layer>

The inorganic oxide layer 40 includes, for example, aluminum oxide, silicon oxide, magnesium oxide, titanium oxide, tin oxide, zinc oxide, indium oxide, and the like, and in particular, aluminum oxide or silicon oxide is preferable because productivity is excellent, and the oxygen barrier property and water vapor bather property under heat resistance and moisture heat resistance are excellent. The inorganic oxide layer 40 may contain one of these materials alone or these materials in combination of two or more.

The thickness of the inorganic oxide layer 40 is preferably 1 to 200 nm, and if the thickness is 1 nm or more, an excellent oxygen barrier property and an excellent water vapor barrier property can be obtained, while if the thickness is 200 nm or less, the producing cost can be kept low, and at the same time, cracks due to external forces such as bending and pulling are unlikely to occur, and deterioration of the bather property can be suppressed.

The inorganic oxide layer 40 can be formed, for example, by known film formation methods such as a vacuum vapor deposition method, a sputtering method, an ion plating method, a plasma vapor phase growth method (CVD), and the like.

<Oxygen Bather Coating>

The oxygen barrier coating 20 may be one known as an oxygen barrier coating formed by a wet coat method. The oxygen barrier coating 20 is obtained by forming a coating film made of a coating agent on the base layer 30 or the inorganic oxide layer 40 by a wet coat method and drying the coating film. The coating film is a wet coating, and the coating is a dry coating.

As the oxygen barrier coating 20, a coating containing at least one of a metal alkoxide and its hydrolyzate or a reaction product thereof, and a water-soluble polymer (organic-inorganic composite coating) is preferable. Further, a coating further containing at least one of a silane coupling agent and a hydrolyzate thereof is preferable.

The metal alkoxide and its hydrolyzate contained in the organic-inorganic composite coating include, for example, those represented by the general formula $M(OR)_n$ such as tetraethoxysilane $[Si(OC_2H_5)_4]$, triisopropoxyaluminum $[Al(OC_3H_7)_3]$, and the like, and their hydrolysates. One of these may be contained alone or these may be contained in combination of two or more.

The total content of at least one of the metal alkoxide and its hydrolyzate or the reaction product thereof in the organic-inorganic composite coating is, for example, 40 to 70% by mass. From the viewpoint of further reducing the oxygen permeability, the lower limit of the total content of at least one of the metal alkoxide and its hydrolyzate or the reaction product thereof in the organic-inorganic composite coating may be 50% by mass. From the same viewpoint, the upper limit of the total content of at least one of the metal alkoxide and its hydrolyzate or the reaction product thereof in the organic-inorganic composite coating may be 65% by mass.

The water-soluble polymer contained in the organic-inorganic composite coating is not particularly limited, and examples thereof include polyvinyl alcohol-based polymers, polysaccharides such as starch, methyl cellulose, carboxymethyl cellulose, and the like, and polymers such as acrylic polyol-based polymers, and the like. From the viewpoint of further improving the oxygen gas barrier property, the water-soluble polymer preferably contains a polyvinyl alcohol-based polymer. The number average molecular weight of the water-soluble polymer is, for example, 40,000 to 180,000.

The polyvinyl alcohol-based water-soluble polymer can be obtained, for example, by saponifying (including partially saponifying) polyvinyl acetate. This water-soluble polymer may be one in which dozens % of acetic acid groups remain, or may be one in which only a few percent of acetic acid groups remain.

The content of the water-soluble polymer in the organic-inorganic composite coating is, for example, 15 to 50% by mass. The lower limit of the content of the water-soluble polymer in the organic-inorganic composite coating may be 20% by mass from the viewpoint of further reducing the oxygen permeability. The upper limit of the content of the water-soluble polymer in the organic-inorganic composite coating may be 45% by mass from the viewpoint of further reducing the oxygen permeability.

The silane coupling agent and its hydrolyzate contained in the organic-inorganic composite coating include silane coupling agents having an organic functional group. Such a silane coupling agent and its hydrolyzate include ethyltrimethoxysilane, vinyltrimethoxysilane, γ-chloropropylmethyldimethoxysilane, γ-chloropropyltrimethoxysilane, glycidoxypropyltrimethoxysilane, γ-methyloxypropyltrimethoxysilane, γ-methacryloxyprepylmethyldimethoxysilane, and hydrolyzates thereof. One of these may be contained alone or these may be contained in combination of two or more.

As at least one of the silane coupling agent and its hydrolyzate, it is preferable to use one having an epoxy group as the organic functional group. The silane coupling agent having an epoxy group includes, for example, γ-glycidoxypropyltrimethoxysilane and β-(3,4-epoxycyclohexyl)ethyltrimethoxysilane. The silane coupling agent having an epoxy group and its hydrolyzate may have an organic functional group different from the epoxy group, such as a vinyl group, an amino group, a methacrylic group or a ureyl group.

The silane coupling agent having an organic functional group and its hydrolyzate can be further improve the oxygen barrier property of the oxygen barrier coating 20 and adhesiveness to the base layer 30 or the inorganic oxide layer 40, due to the interaction between the organic functional group and a hydroxyl group of the water-soluble polymer. In particular, an epoxy group of the silane coupling agent and its hydrolyzate and a hydroxyl group of the polyvinyl alcohol can interact with each other to form an oxygen barrier coating 20 having a particularly excellent oxygen barrier property and adhesiveness to the base layer 30 or the inorganic oxide layer 40.

The total content of at least one of the silane coupling agent and its hydrolyzate or its reaction product in the organic-inorganic composite coating is, for example, 1 to 15% by mass. From the viewpoint of further reducing the oxygen permeability, the lower limit of the total content of at least one of the silane coupling agent and its hydrolyzate or its reaction product in the organic-inorganic composite coating may be 2% by mass. From the same viewpoint, the upper limit of the total content of at least one of the silane coupling agent and its hydrolyzate or its reaction product in the organic-inorganic composite coating may be 12% by mass.

The organic-inorganic composite coating may contain a crystalline inorganic layered compound having a layered structure. The inorganic layered compound includes, for example, clay minerals typified by kaolinite, smectite, mica, and the like. One of these may be used alone or these may be used in combination of two or more. The particle size of the inorganic layered compound is, for example, 0.1 to 10 μm. The aspect ratio of the inorganic layered compound is, for example, 50 to 5000.

As the inorganic layered compound, a smectite group clay mineral is preferable because a coating having an excellent oxygen barrier property and close adhesion strength can be formed by intercalation of a water-soluble polymer between layers of the layered structure. Specific examples of smectite group clay minerals include montmorillonite, hectorite, and saponite, and water-swellable synthetic mica, and the like.

Further, as another preferable example of the oxygen barrier coating 20, a coating containing a polyvalent metal salt of a carboxylic acid, which is a reaction product of a carboxy group of the polycarboxylic acid-based polymer (A) and the polyvalent metal compound (B) (polycarboxylic acid polyvalent metal salt coating) is mentioned. In this case, it may be a polycarboxylic acid polyvalent metal salt coating formed by applying a coating agent in which a polycarboxylic acid-based polymer (A) and a polyvalent metal compound (B) are mixed and heating and drying the agent, or may be a polycarboxylic acid polyvalent metal salt coating formed by applying a coating agent containing the polycarboxylic acid-based polymer (A) as the main component and drying the agent to form a coating A, and applying a coating agent containing the polyvalent metal compound (B) as the main component and drying the agent to form a coating B thereon, and performing a cross-linking reaction between the A/B layers.

[Polycarboxylic Acid-Based Polymer (A)]

The polycarboxylic acid-based polymer is a polymer having two or more carboxy groups in the molecule. The polycarboxylic acid-based polymer includes, for example, (co)polymers of ethylenically unsaturated carboxylic acids; copolymers of ethylenically unsaturated carboxylic acids and other ethylenically unsaturated monomers; and acidic polysaccharides having a carboxyl group in the molecule such as alginic acid, carboxymethyl cellulose, pectin, and the like. The ethylenically unsaturated carboxylic acid includes, for example, acrylic acid, methacrylic acid, itaconic acid, maleic acid, fumaric acid, crotonic acid, and the like. The ethylenically unsaturated monomer copolymerizable with the ethylenically unsaturated carboxylic acid includes, for example, ethylene, propylene, saturated carboxylic acid vinyl esters such as vinyl acetate, and the like, alkyl acrylates, alkyl methacrylates, alkyl itaconates, vinyl chloride, vinylidene chloride, styrene, acrylamide, acrylonitrile, and the like. These polycarboxylic acid-based polymers may be used alone or in combination of two or more.

As the component, among the above, polymers containing a constitutional unit derived from at least one polymerizable monomer selected from the group consisting of acrylic acid, maleic acid, methacrylic acid, itaconic acid, fumaric acid and crotonic acid are preferable, and polymers containing a constitutional unit derived from at least one polymerizable monomer selected from the group consisting of acrylic acid, maleic acid, methacrylic acid and itaconic acid are particularly preferable, from the viewpoint of the gas barrier property of the obtained gas barrier film 1. In the polymer, the proportion of the constitutional unit derived from at least one polymerizable monomer selected from the group consisting of acrylic acid, maleic acid, methacrylic acid and itaconic acid is preferably 80 mol % or more, and more preferably 90 mol % or more (however, the sum of all constitutional units constituting the polymer is taken as 100 mol %). The polymer may be a homopolymer or a copolymer. When the polymer is a copolymer containing a constitutional unit other than the above-mentioned constitutional unit, the other constitutional unit includes, for example, constitutional units derived from an ethylenically unsaturated monomer capable of copolymerizing with the above-mentioned ethylenically unsaturated carboxylic acid, and the like.

The number average molecular weight of the polycarboxylic acid-based polymer is preferably in the range of 2,000 to 10,000,000, more preferably 5,000 to 1,000,000. If the number average molecular weight is less than 2,000, the obtained gas barrier film cannot achieve sufficient water resistance, and moisture may deteriorate the gas barrier property and transparency, or whitening may occur. On the other hand, if the number average molecular weight exceeds 10,000,000, the viscosity of the coating agent for forming the oxygen barrier coating 20 becomes high, and the coatability may be impaired. The number average molecular weight is a polystyrene-equivalent number average molecular weight determined by gel permeation chromatography (GPC).

When a coating agent containing the polycarboxylic acid-based polymer (A) as the main component is applied and dried to form a coating A before forming a coating B, a part of the carboxy group in the polycarboxylic acid-based polymer may be neutralized in advance with a basic compound. By neutralizing a part of the carboxy group of the polycarboxylic acid-based polymer in advance, the water resistance and heat resistance of the coating A can be further improved. As the basic compound, at least one basic compound selected from the group consisting of polyvalent metal compounds, monovalent metal compounds and ammonia is preferable. As the polyvalent metal compound, compounds exemplified in the description of the polyvalent metal compound (B) described later can be used. The monovalent metal compound includes, for example, sodium hydroxide, potassium hydroxide, and the like.

Various additives can be added to a coating agent containing the polycarboxylic acid-based polymer (A) as the main component, and include cross-linking agents, curing agents, leveling agents, defoaming agents, anti-blocking agents, antistatic agents, dispersants, surfactants, softeners, stabilizers, film-forming agents, thickeners, and the like, as long as the barrier performance is not impaired.

The solvent used for a coating agent containing the polycarboxylic acid-based polymer (A) as the main component is preferably an aqueous medium. The aqueous medium includes water, water-soluble or hydrophilic organic solvents, or mixtures thereof. The aqueous medium usually contains water or water as the main component. The content of water in the aqueous medium is preferably 70% by mass or more, and more preferably 80% by mass or more. The water-soluble or hydrophilic organic solvent includes, for example, alcohols such as methanol, ethanol, isopropanol, and the like, ketones such as acetone, methyl ethyl ketone, and the like, ethers such as tetrahydrofuran, and the like, cellosolves, carbitols, nitriles such as acetonitrile, and the like; etc.

[Polyvalent Metal Compound (B)]

The polyvalent metal compound is not particularly limited as long as it is a compound that reacts with a carboxyl group of a polycarboxylic acid-based polymer to form a polyvalent metal salt of the polycarboxylic acid, and includes zinc oxide particles, magnesium oxide particles, magnesium methoxide, copper oxide, calcium carbonate, and the like. These may be used alone or in admixture. Zinc oxide is preferable from the viewpoint of the oxygen barrier property of the oxygen bather coating.

Zinc oxide is an inorganic material having an ultraviolet absorbing ability, and the average particle size of zinc oxide particles is not particularly limited, but the average particle size is preferably 5 μm or less, more preferably 1 μm or less, and particularly preferably 0.1 μm or less, from the viewpoint of a gas barrier property, transparency, and coating suitability.

When a coating agent containing the polyvalent metal compound (B) as the main component is applied and dried to form a coating, various additives may be contained as required in addition to zinc oxide particles as long as the effect of the present disclosure is not impaired. As the additives, a resin that is soluble or dispersible in the solvent used for the coating agent, a dispersant that is soluble or dispersible in the solvent, a surfactant, a softener, a stabilizer, a film-forming agent, a thickener, and the like may be contained.

Among the above, the solvent used for the coating agent preferably contains a resin that is soluble or dispersible in the solvent. This improves the coatability and film-formability of the coating agent. Examples of such resins include alkyd resins, melamine resins, acrylic resins, urethane resins, polyester resins, phenol resins, amino resins, fluororesins, epoxy resins, isocyanate resins, and the like.

Further, it is preferable to contain a dispersant that is soluble or dispersible in the solvent used for the coating agent. This improves the dispersibility of the polyvalent metal compound. As the dispersant, an anionic surfactant or a nonionic surfactant can be used. The surfactant includes various surfactants such as (poly)carboxylic acid salt, alkyl sulfate ester salt, alkylbenzene sulfonic acid salt, alkylnaphthalene sulfonic acid salt, alkylsulfosuccinic acid salt, alkyldiphenylether disulfonic acid salt, alkylphosphoric acid salt, aromatic phosphate ester, polyoxyethylene alkyl ether, polyoxyethylene alkylphenol ether, polyoxyethylene alkyl ester, alkylallyl sulfate ester salt, polyoxyethylene alkyl phosphate ester, sorbitan alkyl ester, glycerin fatty acid ester, sorbitan fatty acid ester, sucrose fatty acid ester, polyethylene glycol fatty acid ester, polyoxyethylene sorbitan alkyl ester, polyoxyethylene alkyl allyl ether, polyoxyethylene derivative, polyoxyethylene sorbitol fatty acid ester, polyoxy fatty acid ester, polyoxyethylene alkylamines, and the like. These surfactants may be used alone or in combination of two or more.

When the coating agent containing the polyvalent metal compound (B) as the main component contains an additive, the mass ratio of the polyvalent metal compound to the additive (polyvalent metal compound:additive) is preferably in the range of 30:70 to 99:1, and preferably in the range of 50:50 to 98:2.

The solvent used for the coating agent containing the polyvalent metal compound (B) as the main component includes, for example, water, methyl alcohol, ethyl alcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethyl ether, dioxane, tetrahydrofuran, ethyl acetate and butyl acetate. Further, these solvents may be used alone or in combination of two or more. Among these, methyl alcohol, ethyl alcohol, isopropyl alcohol, toluene, ethyl acetate, methyl ethyl ketone and water are preferable from the viewpoint of coatability. Further, from the viewpoint of productivity, methyl alcohol, ethyl alcohol, isopropyl alcohol and water are preferable.

When a coating agent in which the polycarboxylic acid-based polymer (A) and the polyvalent metal compound (B) are mixed is applied and dried to form a polycarboxylic acid polyvalent metal salt coating, the polycarboxylic acid polyvalent metal salt coating can be formed by mixing the above-mentioned polycarboxylic acid-based polymer (A), the above-mentioned polyvalent metal compound (B), and water or alcohol as a solvent, a resin and a dispersant that can be dissolved or dispersed in the solvent, and if necessary, additives to prepare a coating agent, and applying the agent by a known coat method and drying it. The coat method includes, for example, a casting method, a dipping method, a roll coat method, a gravure coat method, a screen printing method, a reverse coat method, a spray coat method, a kit coat method, a die coat method, a metering bar coat method, a chamber doctor combined coat method, a curtain coat method, and the like.

The thickness of the oxygen barrier coating 20 is set according to the required oxygen barrier property, and may be, for example, 0.05 to 5 μm. The thickness of the oxygen barrier coating 20 is preferably 0.05 to 1 μm, and more preferably 0.1 to 0.5 μm. When the thickness of the oxygen barrier coating 20 is 0.05 μm or more, a sufficient oxygen barrier property can be easily obtained. When the thickness of the oxygen barrier coating 20 is 1 μm or less, it is easy to form a uniform coated surface, and the drying load and the production cost can be suppressed, and the usefulness of using the resin base material 10 having the surface having a black area ratio of 0.15% or less, which is the feature of the present disclosure, is increased.

The gas barrier film having the organic-inorganic composite coating or the polycarboxylic acid polyvalent metal salt coating as the oxygen barrier coating 20 shows an excellent oxygen barrier property even after boil treatment or retort sterilization treatment, and even when laminated with a sealant film to provide a wrapping material for boiling and retort treatment, has sufficient close adhesion strength and sealing strength, and further, has transparency not found in metal foils and metal vapor-deposited coatings, and has excellent bending resistance and stretch resistance, and has an advantage of no risk of generation of harmful substances such as dioxin and the like, and other advantages.

[Production Method of Gas Barrier Film]

The gas barrier film 1 can be produced by forming the base layer 30 or the inorganic oxide layer 40 or both the base layer 30 and the inorganic oxide layer 40 on one surface 12 of the resin base material 10, and then forming the oxygen barrier coating 20 on the base layer 30 or the inorganic oxide layer 40.

The method for producing the gas bather film 1 of the present disclosure has, for example, a sorting step, a base layer forming step, an inorganic oxide layer forming step, and an oxygen barrier coating forming step.

The sorting step includes, for example, a step of sorting a resin base material having a black surface area ratio of 0.15% or less as the resin base material. The black area ratio of the surface of the resin base material is measured by the same method as the method for measuring the black area ratio of one surface 12 of the resin base material 10 described above.

As the resin base material 10, a commercially available product may be used, or a product produced by a known method may be used.

The base layer forming step includes, for example, a step of applying a coating agent to at least one surface 12 of the resin base material 10 by a wet coat method to form a coating film, and drying the coating film (removing the solvent) to form a base layer 30.

As the method for applying a coating agent, known wet coat methods can be used. The wet coat method includes, for example, a roll coat method, a gravure coat method, a reverse coat method, a die coat method, a screen printing method, a spray coat method, and the like.

As the method for drying the coating film made of a coating agent, known drying methods such as hot air drying, hot roll drying, infrared irradiation, and the like can be used. The drying temperature of the coating film is preferably, for example, 50 to 200° C. The drying time is preferably, for example, 1 second to 5 minutes, though varying depending on the thickness of the coating film, the drying temperature, and the like.

The inorganic oxide layer forming step includes, for example, a step of forming an inorganic oxide layer 40 on one surface 12 of the resin base material 10 or on the base layer 30 by the above-described vacuum vapor deposition method, sputtering method, ion plating method, plasma vapor phase growth method (CVD) or the like.

The oxygen barrier coating forming step includes, for example, a step of applying a coating agent on the base layer 30 or the inorganic oxide layer 40 by a wet coat method to form a coating film, and drying the coating film (removing the solvent) to form an oxygen barrier coating 20.

As the method for applying a coating agent, known wet coat methods can be used. The wet coat method includes, for example, a roll coat method, a gravure coat method, a reverse coat method, a die coat method, a screen printing method, a spray coat method, and the like.

As the method for drying the coating film made of a coating agent, known drying methods such as hot air drying, hot roll drying, infrared irradiation, and the like can be used. The drying temperature of the coating film is preferably, for example, 50 to 200° C. The drying time is preferably, for example, 1 second to 5 minutes though varying depending on the thickness of the coating film, the drying temperature, and the like.

The oxygen barrier coating 20 may be formed by one-time application and drying, or may be formed by repeating application and drying a plurality of times with the same kind of coating agent or different kinds of coating agents.

In the base layer forming step, the inorganic oxide layer forming step, and the oxygen barrier coating forming step, the base layer 30, the inorganic oxide layer 40, or the oxygen barrier coating 20 is formed on one surface 12 of the resin base material 10. At this time, the black area ratio of one surface 12 is 0.15% or less. Further, the base layer 30, the inorganic oxide layer 40, or the oxygen barrier coating 20 may be formed on both surfaces of the resin base material 10. In that case, the black area ratio of the other surface 14 of the resin base material 10 is 0.15% or less.

When the base layer 30, the inorganic oxide layer 40, or the oxygen bather coating 20 is formed on both surfaces of the resin base material, if the black area ratio on both surfaces of the resin base material is 0.15% or less, the oxygen barrier property is further enhanced and the printability is good, which is preferable.

When the method for producing the gas barrier film 1 of the present disclosure includes a sorting step, a resin base material having a black surface area ratio on the surface of 0.15% or less can be efficiently applied. Therefore, by having the sorting step, the gas barrier film 1 having a further improved oxygen barrier property can be efficiently produced. In addition, by having the sorting step, the gas barrier film 1 having good printability can be efficiently produced.

The gas barrier film 1 of the present disclosure may further include a printing layer, a protective layer, a light-shielding layer, an adhesive layer, a heat-sealable heat fusion layer, other functional layers, and the like, if necessary.

When the gas barrier film 1 of the present disclosure has a heat-sealable heat fusion layer, the heat fusion layer is arranged on at least one outermost surface layer of the gas barrier film 1. Since the gas barrier film 1 has a heat fusion layer, the gas barrier film 1 becomes one (for example, a package or a lid) which can be sealed by heat sealing.

The heat fusion layer can be laminated, for example, on a laminate obtained by forming the base layer 30, the inorganic oxide layer 40, and the oxygen barrier coating 20 of the present embodiment on one or both sides of a resin base material, by a known dry lamination method, extrusion lamination method or the like using a known adhesive such as a polyurethane-based adhesive, polyester-based adhesive, polyether-based adhesive or the like.

<Action and Effect>

In the gas barrier film 1 of the present disclosure, the luminance in a monochrome image is binarized, and the ratio of the total area of the black regions having a size of 100 $\mu m^2$ or more (black area ratio) is calculated. The oxygen barrier coating 20 is laminated on at least one surface of the resin base material 10 having a black area ratio of 0.15% or less via the base layer 30, the inorganic oxide layer 40, or both the base layer 30 and the inorganic oxide layer 40.

In the gas barrier film 1 of the present disclosure, an oxygen barrier coating 20 is formed on the surface of a resin base material 10 having a black area ratio of 0.15% or less via a base layer 30 or an inorganic oxide layer 40 or both the layers, therefore, a coating defect due to a large convex portion on the surface of the base material is less likely to occur, and the oxygen barrier property can be more improved easily. In addition, it is easy to make the printability of the gas barrier film 1 better.

Therefore, by using the gas barrier film 1 of the present disclosure as a packaging material, the quality retention of the contents can be improved at low cost.

In addition, by using the gas barrier film 1 of the present disclosure as a packaging material, printing can be easily and beautifully performed.

Embodiment 2

As described above, the oxygen barrier property of a gas barrier film having a coating formed on the surface of a resin base material by a wet coat method, a vapor deposition method, a sputtering method, or the like may be unstable in some cases depending on the production lot. Specifically, the oxygen barrier property of the gas barrier film may be inferior to the original oxygen barrier property, that is, the oxygen barrier property assumed from the material constituting the coating and the thickness of the coating. In particular, when the thickness of the coating becomes thin, such a problem tends to occur easily. Therefore, it is necessary to make the thickness of the gas barrier layer thicker than necessary, which causes problems of poor productivity and excessive material cost.

In addition, as the resin base material, a polyolefin resin-based film is inexpensive and has a high water vapor barrier property, and is often used as a packaging material, however, since it has poor close adhesion to a gas barrier coating, there is a drawback that the lamination strength is inferior when laminated with a heat-sealable resin film to give a gas barrier packaging material.

The embodiment 2 has an object of providing a gas barrier film which, even if the thickness of the coating for imparting an oxygen barrier property is thin, sufficiently exhibits the original oxygen barrier property to show an excellent gas barrier property, and has sufficient close adhesion strength as the packaging material, and providing a method for producing the same.

Figure 8:
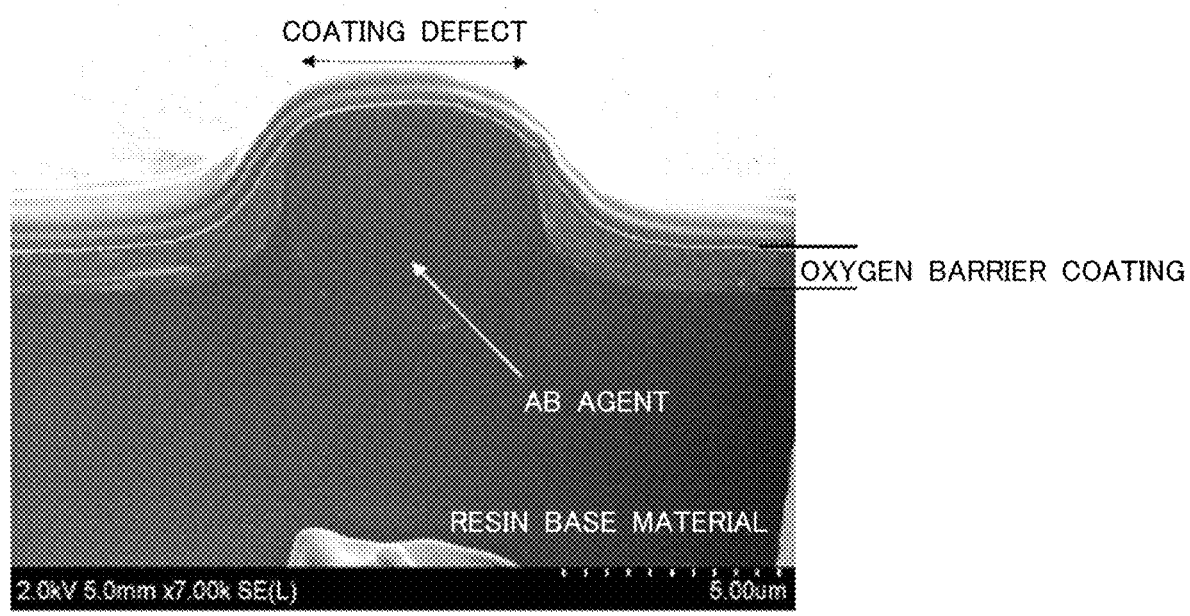
FIG. 8 is a cross-sectional electron microscopic image taken by a focused ion/electron beam processing observation device showing that a coating defect has occurred at the location where the AB agent is present on the resin base material.

In order to investigate the cause of the above problem, the present inventors observed the surface and cross section of the gas barrier film having a poor oxygen barrier property in detail with an optical microscope or an electron microscope. As a result of cross-sectional electron microscopic observation with a focused ion/electron beam processing observation device at the location where the anti-blocking agent (hereinafter, also referred to as "AB agent") added to prevent blocking of the resin base material is present, it was confirmed that a defect having a width of several $\mu m$ occurred in the coating at the portion where the AB agent protruded high (an example of a cross-sectional electron microscopic image is shown in FIG. 8). It is considered that this coating defect became a path for gas permeation and the oxygen barrier property was not sufficiently exhibited. On the surface of the resin base material, there are protrusions of various sizes due to the AB agent. It is considered that the protrusion height and protrusion density of the AB agent vary depending on the production lot of the resin base material, and when the surface of the resin base material was coated with a gas barrier coating (oxygen barrier coating), the coating was not formed locally at the position of a large convex portion, a defect occurred, and the oxygen barrier property became unstable.

Then, the present inventors have devised a method for accurately grasping, in a short time, the surface state of a wide range of the resin base material, which affects the oxygen barrier property of the gas barrier film, leading to the present disclosure.

[1] A gas barrier film comprising a resin base material, and an oxygen barrier coating formed on the first surface side which is one surface of the resin base material, and having at least one of a base layer and an inorganic oxide layer between the resin base material and the oxygen barrier coating, wherein the resin base material has two or more resin layers, and of the two or more resin layers, the resin layer forming the first surface is made of a polyolefin-based copolymer resin, and on the first surface, the density of protrusions having a ferret diameter of 8 $\mu m$ or more is 20 pieces/$mm^2$ or less as measured by the following measuring method.

<Measuring Method>

A white LED line light source is used to irradiate an arbitrary region of 36.6 mm square on the first surface of the resin base material with a light source distance of 100 mm and an incident angle of 83°, and transmitted light with a measurement angle of 90° is photographed by a monochrome line camera to acquire a photographed image, and an analysis image having 3551 pixels×5684 pixels (2.5×4.0 mm) is cut out from the photographed image, and protrusions having a ferret diameter of 8 $\mu m$ or more in the analysis image are counted.

[2] The gas barrier film, wherein the resin base material is made of a polyolefin-based resin.

[1] The gas barrier film, wherein the base layer has a thickness of 0.01 to 1 $\mu m$.

[4] The gas barrier film, wherein the base layer contains an organic polymer as the main component, and the organic polymer contains at least one of a polyacrylic resin, a polyol-based resin, a polyurethane-based resin, a polyamide-based resin, and a reaction product of these organic polymers.

[5] The gas barrier film, wherein the inorganic oxide layer has a thickness of 1 to 200 nm.

[6] The gas barrier film, wherein the inorganic oxide layer is made of aluminum oxide or silicon oxide.

[7] The gas barrier film, wherein the oxygen barrier coating has a thickness of 0.05 to 1 μm.

[8] The gas barrier film, wherein the oxygen barrier coating is a coating containing at least one of a metal alkoxide, a hydrolyzate of a metal alkoxide, and a reaction product of a metal alkoxide or a hydrolyzate of a metal alkoxide, and a water-soluble polymer.

[9] The gas barrier film, wherein the oxygen barrier coating further contains at least one of a silane coupling agent, a hydrolyzate of a silane coupling agent, and a reaction product of a silane coupling agent or a hydrolyzate of a silane coupling agent.

[10] The gas barrier film, wherein the oxygen barrier coating contains a carboxylic acid polyvalent metal salt which is a reaction product of a carboxy group of a polycarboxylic acid-based polymer (A) and a polyvalent metal compound (B).

[11] A method for producing the gas barrier film as described in any one of [1] to [10], comprising a step of measuring the number of protrusions on one surface of a resin base material by the following measuring method to take a resin base material in which the density of protrusions having a ferret diameter of 8 μm or more is 20 pieces/mm$^2$ or less as the resin base materiel, and a step of applying a coating agent to at least the first surface side of the resin base material to form an oxygen barrier coating:

<Measuring Method>

A white LED line light source is used to irradiate an arbitrary region of 36.6 mm square on the first surface of the resin base material with a light source distance of 100 mm and an incident angle of 83°, and transmitted light with a measurement angle of 90° is photographed by a monochrome line camera to acquire a photographed image, and an analysis image having 3551 pixels×5684 pixels (2.5×4.0 mm) is cut out from the photographed image, and protrusions having a ferret diameter of 8 μm or more in the analysis image are counted.

Figure 4:
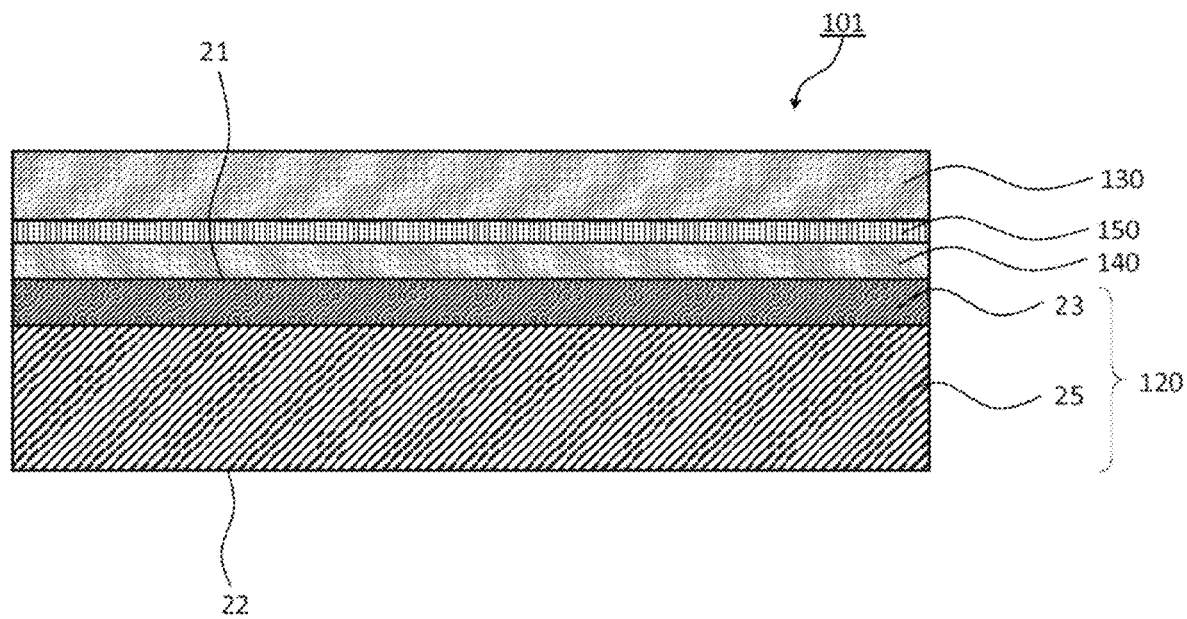
FIG. 4 is a cross-sectional view of the gas barrier film of Embodiment 2.

The gas barrier film of the present disclosure will be described with reference to embodiments. FIG. 4 is a schematic cross-sectional view of the gas barrier film 101 according to Embodiment 2. The dimensional ratio in FIG. 4 is different from the actual one for convenience of explanation. The gas barrier film 101 has a resin base material 120, a base layer 140, an inorganic oxide layer 150, and an oxygen barrier coating 130. Either the base layer 140 or the inorganic oxide layer 150 may be omitted. The base layer 140 is laminated in contact with the first surface 21 of the resin base material 120, and the inorganic oxide layer 150 is laminated on the surface opposite to the surface of the base layer 140 in contact with the resin base material 120. The inorganic oxide layer 150 is laminated in contact with the base layer 140, and the oxygen barrier coating 130 is located in contact with the surface opposite to the surface of the inorganic oxide layer 150 in contact with the base layer 140. When the base layer 140 is not provided, the inorganic oxide layer 150 is laminated on the first surface 21 of the resin base material 120. When the inorganic oxide layer 150 is not provided, the oxygen barrier coating 130 is laminated on the base layer 140.

<Resin Base Material>

The resin base material 120 has two or more resin layers including the base layer 25. In the present embodiment, it has a base layer 25 and a surface layer 23 located on one surface of the base layer 25. The surface layer 23 constitutes the first surface 21 of the resin base material 120. The resin base material 120 contains a resin, and each of the surface layer 23 and the base layer 25 constituting the resin base material 120 also contains a resin.

The base layer 25 adjusts the mechanical properties, chemical properties, thermal properties, optical properties, and the like of the resin base material 120. The mechanical properties include rigidity, elongation, chewy property, tear strength, impact strength, piercing strength, pinhole resistance, and the like. Chemical properties include water vapor barrier property, gas barrier property, aroma retention property, chemical resistance, oil resistance, and the like. Thermal characteristics include melting point/glass transition point, heat resistant temperature, cold resistant temperature, heat shrinkage rate, and the like. Optical characteristics include transparency, gloss, and the like.

As the resin used as a raw material for the base layer 25, a polyolefin-based resin is preferable from the viewpoint of easy availability and water vapor barrier property. The polyolefin-based resin includes polyethylene, polypropylene, polybutene, and the like. Polypropylene may be a homopolymer, a random copolymer, or a block copolymer.

Homopolymers are polypropylenes consisting of elemental propylene alone. The random copolymer is polypropylene in which propylene, which is the main monomer, and a comonomer of a different type from propylene are randomly copolymerized to form a homogeneous phase. The block copolymer is polypropylene that forms an inhomogeneous phase by copolymerizing propylene, which is the main monomer, and the above-mentioned comonomer in a block-like manner or polymerizing in a rubber-like manner. Any one of these polyolefin-based resins may be used alone, or two or more of them may be blended and used.

The base layer 25 may contain additives. The additive can be appropriately selected from various known additives. Examples of additives include fillers, anti-blocking agents (AB agents), heat-resistant stabilizers, weather-resistant stabilizers, UV absorbers, lubricants, slip agents, nucleating agents, antistatic agents, anti-fog agents, pigments, and dyes. Any one of these additives may be used alone, or two or more of them may be used in combination. The content of the additive in the base layer 25 can be appropriately adjusted as long as it does not interfere with the effect of the present disclosure.

The base layer 25 may have a single-layer structure or a multi-layer structure. The thickness of the base layer 25 may be, for example, 3 to 200 μm and 6 to 30 μm.

The surface layer 23 is constituted of a polyolefin-based copolymer resin. The polyolefin-based copolymer resin includes, for example, an ethylene/propylene copolymer, an ethylene/1-butene copolymer, a propylene/1-butene copolymer, a propylene/pentene copolymer, an ethylene/propylene/1-butene copolymer, an ethylene/acrylic acid copolymer, an ionomer obtained by cross-linking an ethylene/acrylic acid copolymer with a metal ion, a propylene/acrylic acid copolymer, and the like, and these resins may be random copolymers or block copolymers, respectively. Any one of these resins may be used alone, or two or more of them may be blended and used. Since the surface layer 23 is made of a polyolefin-based copolymer resin, the close adhesion to any of the base layer 140, the inorganic oxide layer 150, and the oxygen barrier coating 130 laminated on the resin base material 120 is improved.

The surface layer 23 may contain additives. The additive can be appropriately selected from various known additives. Examples of additives include anti-blocking agents (AB agents), heat-resistant stabilizers, weather-resistant stabilizers, ultraviolet absorbers, lubricants, slip agents, nucleating agents, antistatic agents, anti-fog agents, pigments, and dyes. Any one of these additives may be used alone, or two or more of them may be used in combination. The content of the additive in the surface layer 23 can be appropriately adjusted as long as it does not interfere with the effect of the present disclosure.

When the surface layer 23 contains the AB agent, protrusions derived from the AB agent are formed on the first surface 21 of the resin base material 120. These protrusions prevent the films from adhering closely to each other, and improve the processing suitability in winding, unwinding, and transporting the film. In particular, the average particle size of the AB agent and its addition amount affect the size and number of protrusions on the first surface 21, so that the number of protrusions having a ferret diameter of 8 μm or more in the measuring method described later is desirably adjust to 20 pieces/mm$^2$ or less.

The AB agent is made of solid particles, and includes organic particles, inorganic particles, and the like. The organic particle includes, for example, polymethyl methacrylate particles, polystyrene particles, polyamide particles, and the like. These organic particles can be obtained by, for example, emulsion polymerization, suspension polymerization, and the like. The inorganic particle includes, for example, silica particles, zeolite, talc, kaolinite, feldspar, and the like. Any one of these AB agents may be used alone or these AB agents may be used in combination of two or more. As the AB agent, polymethylmethacrylate particles are preferable in the organic system, and silica particles are preferable in the inorganic system.

The average particle size of the AB agent is preferably 0.1 μm or more and 5 μm or less. From the viewpoint of achieving both the blocking prevention performance and the gas barrier performance of the gas barrier film 101, the average particle size of the AB agent is particularly preferably 1 μm or more and 4 μm or less. The average particle size of the AB agent is measured by the Coulter method.

The amount of the AB agent added is preferably, for example, 0.05 to 0.4% by mass with respect to the total mass of the surface layer 23. Specifically, the amount of the AB agent added to the surface layer 23 is calculated by the following formula.

Amount of AB agent added [mass %]={(i)/100}×{(ii)/100}×100

In the formula, (i) denotes the concentration (% by mass) of the AB agent in the masterbatch resin chip formed into pellets by melt extrusion after adding the AB agent to the resin and stirring the resin, and putting it in an extruder and kneading the resin. (ii) denotes the concentration (% by mass) of the masterbatch resin chip containing the AB agent with respect to the total mass of the resin pellets constituting the surface layer 23 when the masterbatch resin chip containing the AB agent is blended with the resin containing no AB agent. Similarly, when the AB material is added to the base layer 25, the addition amount is preferably 0.05 to 0.4% by mass with respect to the total mass of the base layer 25, and the addition amount can be determined by the above formula.

The thickness of the surface layer 23 may be, for example, 0.1 to 10 μm, and further may be 0.5 to 5.0 μm.

The resin base material 120 is preferably a coextruded film containing at least a surface layer 23 and a base layer 25. The resin base material 120 may be a stretched film or an unstretched film.

The resin base material 120 preferably has a biaxially stretched polypropylene film. Since the biaxially stretched polypropylene film is particularly excellent in water vapor barrier performance, having the biaxially stretched polypropylene film improves the water vapor barrier property of the gas barrier film 101. The biaxially stretched polypropylene film may be a film obtained by processing at least one of a homopolymer, a random copolymer, a block copolymer, and the like. The biaxially stretched polypropylene film is preferably a coextruded film.

The base layer 25 may be made of a biaxially stretched polypropylene film, or may be a laminate of a biaxially stretched polypropylene film and another resin film. The other resin films include, for example, films of polyesters such as polyethylene terephthalate, polyethylene naphthalate, and the like, films of polyolefin-based resins such as polyethylene, and the like, polystyrene films, films of polyamides such as nylon, and the like, polycarbonate films, polyacrylonitrile films, polyimide films, and the like; called engineering plastic films.

The thickness of the resin base material 120 is not particularly limited, and is appropriately selected depending on the price and application while considering the suitability as a packaging material and the suitability for laminating other coatings. The thickness of the resin base material 120 is practically preferably 3 μm to 200 μm, more preferably 5 μm to 120 μm, and even more preferably 6 μm to 30 μm.

The first surface 21 of the resin base material 120 may be subjected to at least one treatment selected from the group consisting of a chemical treatment, a solvent treatment, a corona treatment, a plasma treatment, and an ozone treatment.

When protrusions due to the AB agent are formed on the first surface 21 of the resin base material 120, blocking of the film can be prevented, but on the other hand, in the large convex portion, there is a tendency that the base layer 140, the inorganic oxide layer 150 and the oxygen barrier coating 130 to be formed thereon generate a coating defect that serves as a path for gas permeation, and there is generated a risk that the oxygen barrier property of the gas barrier film 101 may be deteriorated. However, the first surface 21 of the resin base material 120 of the gas barrier film 101 of the present disclosure is characterized by having not less than 20 protrusions/mm$^2$ having a ferret diameter of 8 μm or more as measured by the measuring method shown below, and is unlikely to occur a coating defect. The first surface 21 of the resin base material 120 has more preferably not more than 17 pieces/mm$^2$ of protrusions having a ferret diameter of 8 μm or more, and further preferably not more than 15 pieces/mm$^2$ of protrusions having a ferret diameter of 8 μm or more, and the number of protrusions having a ferret diameter of 8 μm or more may be 0/mm$^2$. Most of the protrusions having a ferret diameter of 8 μm or more have a height from the flat portion of the first surface 21 to the apex of the protrusion of more than 1 μm, and tend to cause coating defects of the oxygen barrier coating. Therefore, if the number of protrusions having a ferret diameter of 8 μm or more is 20/mm$^2$ or less, coating defects are less likely to occur in the base layer 140, the inorganic oxide layer 150, and the oxygen barrier coating 130, thus, is easier to make the oxygen barrier property of the gas barrier film 101 better. The protrusions formed on the first surface 21 of the resin base material 120 may be derived from the AB agent or may be caused by other factors, and are not particularly limited. In the present specification, the number of protrusions on the first surface 21 of the resin base material 120 is a value measured by the following measuring method.

<Measuring Method>

An arbitrary region of 36.6 mm square of the resin base material 120 is irradiated with light using a white LED line light source at a light source distance of 100 mm and an incident angle of 83° from the second surface 22 side, which is the opposite surface to the first surface 21 of the resin base material 120. A transmitted light with a measurement angle of 90° is photographed with a monochrome line camera to acquire a photographed image. An analysis image of 3551 pixels×5684 pixels (2.5×4.0 mm) is cut out from the acquired photographed image. The cut out analysis image is analyzed by an image analysis software, that is, protrusions having a ferret diameter of 8 μm or more are extracted and its number is counted, and converted into a value per mm², which is taken as the number of protrusions having a ferret diameter of 8 μm or more.

Hereinafter, a method for measuring the number of protrusions on the first surface 21 of the resin base material 120 will be described with reference to the drawings. First, the measuring device will be described.

(Measuring Device)

Figure 5:
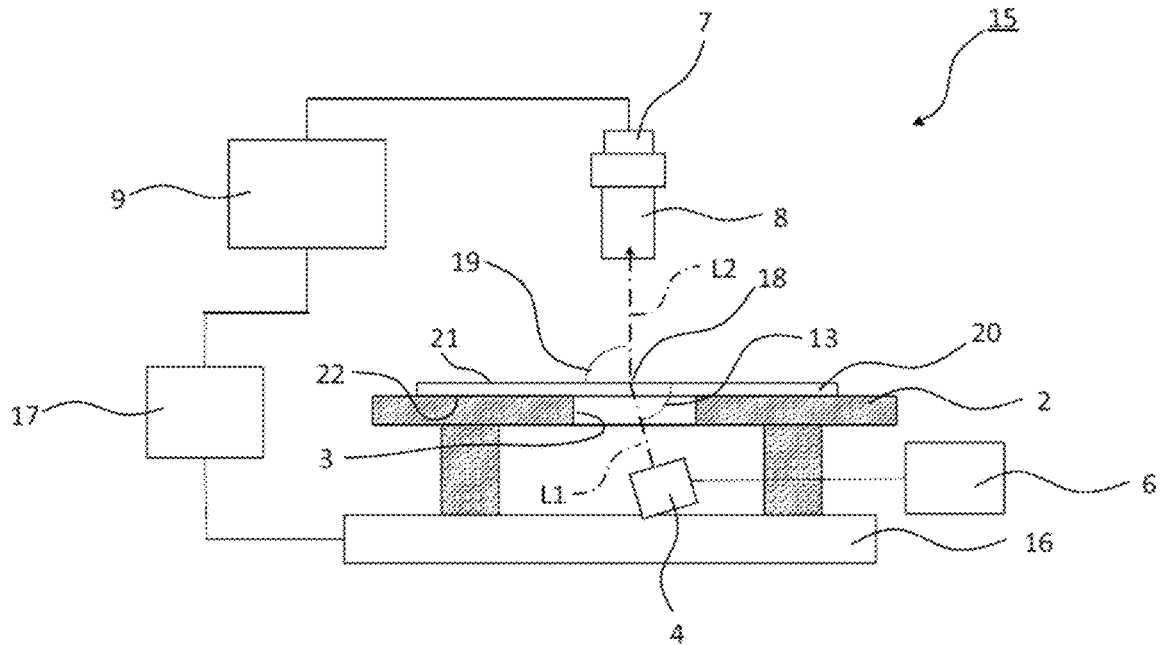
FIG. 5 is a schematic view illustrating a measuring device for measuring the number of protrusions on the first surface of the resin base material.

As shown in FIG. 5, the measuring device 15 for measuring the number of protrusions on the first surface 21 of the resin base material 120 includes a sample holder 2, a light source 4, and a monochrome line camera 7. The sample holder 2 is installed on the transport device 16 and can move in the horizontal direction. A punch hole 3 is formed in the central portion of the sample holder 2. The light source 4 is located below the sample holder 2 and is installed at a position where the light source distance is 100 mm, and the light source control device 6 is connected to the light source 4. The monochrome line camera 7 is located above the sample holder 2, and the monochrome line camera 7 is equipped with a macro lens 8. An image processing device 9 is connected to the monochrome line camera 7. A transport control unit 17 is connected to the image processing device 9. The transport control unit 17 is connected to the transport device 16.

The sample holder 2 is not particularly limited as long as it is flat and horizontal, and a known holder may be used. As the light source 4, a white LED line light source of visible light is preferable.

It is preferable to use a monochrome line camera 7 having 16384 pixels and a sensor size of 1 pixel of 3.52 μm. The monochrome line camera 7 is preferably controlled by the image processing device 9 via a standard interface such as a camera link or USB. The image processing device 9 is composed of, for example, a personal computer equipped with a frame grabber or the like connected to the monochrome line camera 7, and image processing software or the like for controlling the frame grabber. A personal computer equipped with a frame grabber or the like and image processing software for controlling the frame grabber are widely distributed or commercially available, and they can be used as the image processing device 9. The image processing software includes, for example, public domain software "ImageJ" developed by the National Institutes of Health (NIH).

As the transport device 16, it is preferable to use a uniaxial stage driven by a stepping motor, or the like. In the transport device 16, the transport control unit 17 controls the transport speed, transport start, transport stop, and the like.

(Sample Preparation)

Next, a method for measuring the number of protrusions on the first surface of the resin base material 120 will be described. As shown in FIG. 5, first, the first surface 21 of the resin base material 120 is directed toward the monochrome line camera 7, and the resin base material 120 is fixed to the sample holder 2 so that there is no in-plane height difference. When fixing the resin base material 120, it is preferable to fix the end portion of the resin base material 120 with OPP tape, masking tape, or the like. The resin base material 120 is fixed to the sample holder 2 so that the image measurement position 18 of the resin base material 120 is aligned with the punched hole 3.

(Acquisition of Photographed Image)

Next, the white LED line light is incident from the light source 4. The amount of light of the light source 4 can be adjusted by the light source control device 6. The amount of light of the incident light L1 is preferably adjusted by using the light source control device 6 so that the amount of light at the image measurement position 18 is 442 lux. The incident light L1 from the light source 4 is slanted by 7° from the vertical direction with an incident angle 13 of 83° with respect to the first surface 21, a monochrome line camera 7 is installed at a position where the measurement angle 19 is 90° with respect to the first surface 21, and the transmitted light L2 transmitted through the image measurement position 18 is photographed by the monochrome line camera 7 via the macro lens 8. At this time, the magnification of the macro lens 8 is 5 times, the F value is 2.8, and the resolution is 0.704 μm. The measurement range of the monochrome line camera 7 at the image measurement position 18 is a region of 36.6 mm square, and the effective illumination range of the light source 4 is a region of 36.6 mm square or more.

The measurement range of the transmitted light L2 is a region of 36.6 mm square on the first surface 21. The transport device 16 is moved so that the measurement range is within the above-mentioned area. When the transport device 16 is a stepping motor or the like, a pulse signal indicating the transport speed is taken into the image processing device 9. It is preferable that the transport speed for moving the transport device 16 is set to be equal to the product of the spatial resolution and the capture frequency. The spatial resolution is determined by the sensor size (3.52 μm) of the monochrome line camera 7 and the magnification (5 times) of the macro lens 8. The capture frequency is the capture frequency of one line of the monochrome line camera 7. The transport speed is set to be equal to the product of the spatial resolution and the capture frequency, and the resin base material 120 is continuously transported at the image measurement position 18 of the monochrome line camera 7. At the image measurement position 18, the image of the first surface 21 of the resin base material 120 is measured and photographed by the monochrome line camera 7.

The exposure time of the monochrome line camera 7 is set to 80 μs. The capture frequency period is set to be longer than the exposure time. The resin base material 120 is transported, and a photographed image of 5684 pixels or more is acquired in the transport direction of the resin base material 120.

(Image Analysis)

In the acquired captured image, the central 3551 pixels corresponding to the sensor arrangement direction of the monochrome line camera 7 (the direction orthogonal to the transport direction of the resin base material 120) and 5684 pixels in the transport direction are cut out and used as an image for analysis. In the transport direction, it is possible to cut out 5684 pixels or more to widen the measurement range. The cut out analysis image is analyzed with image analysis software.

Figure 6:
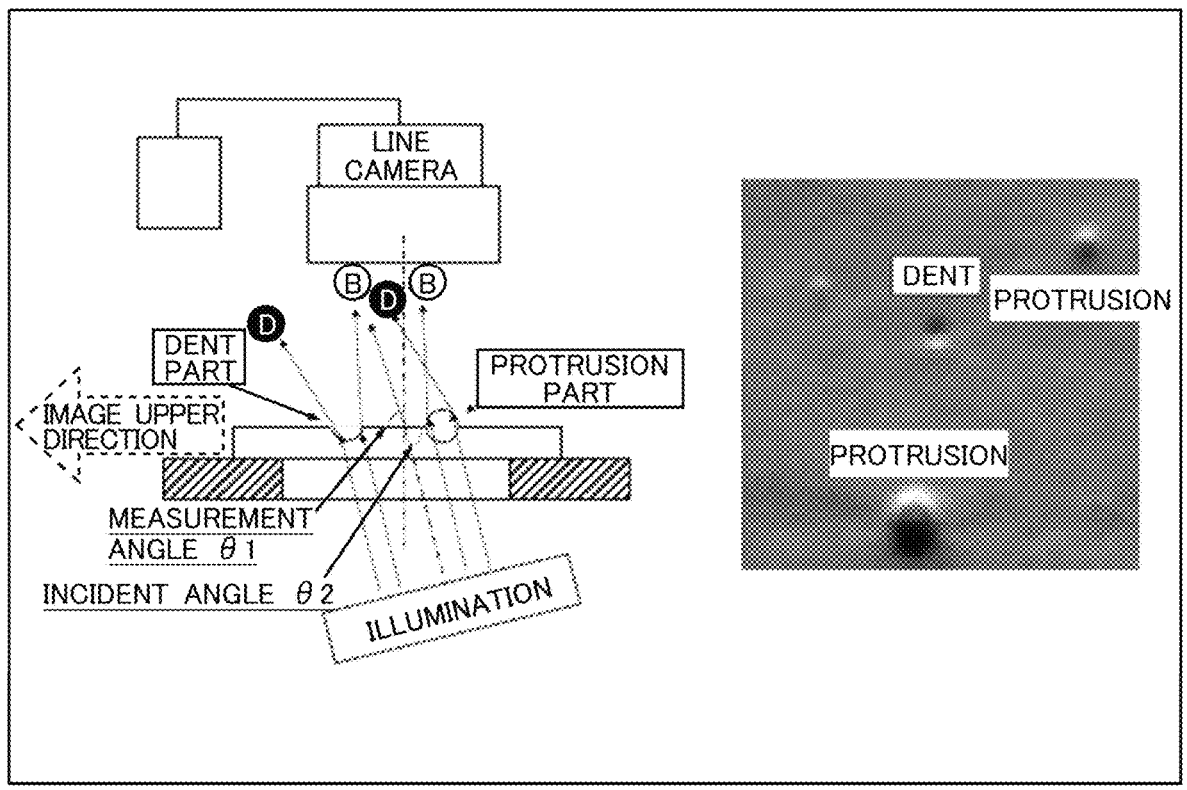
FIG. 6 is a schematic view illustrating the principle of detecting the protruded portion.
Figure 7:
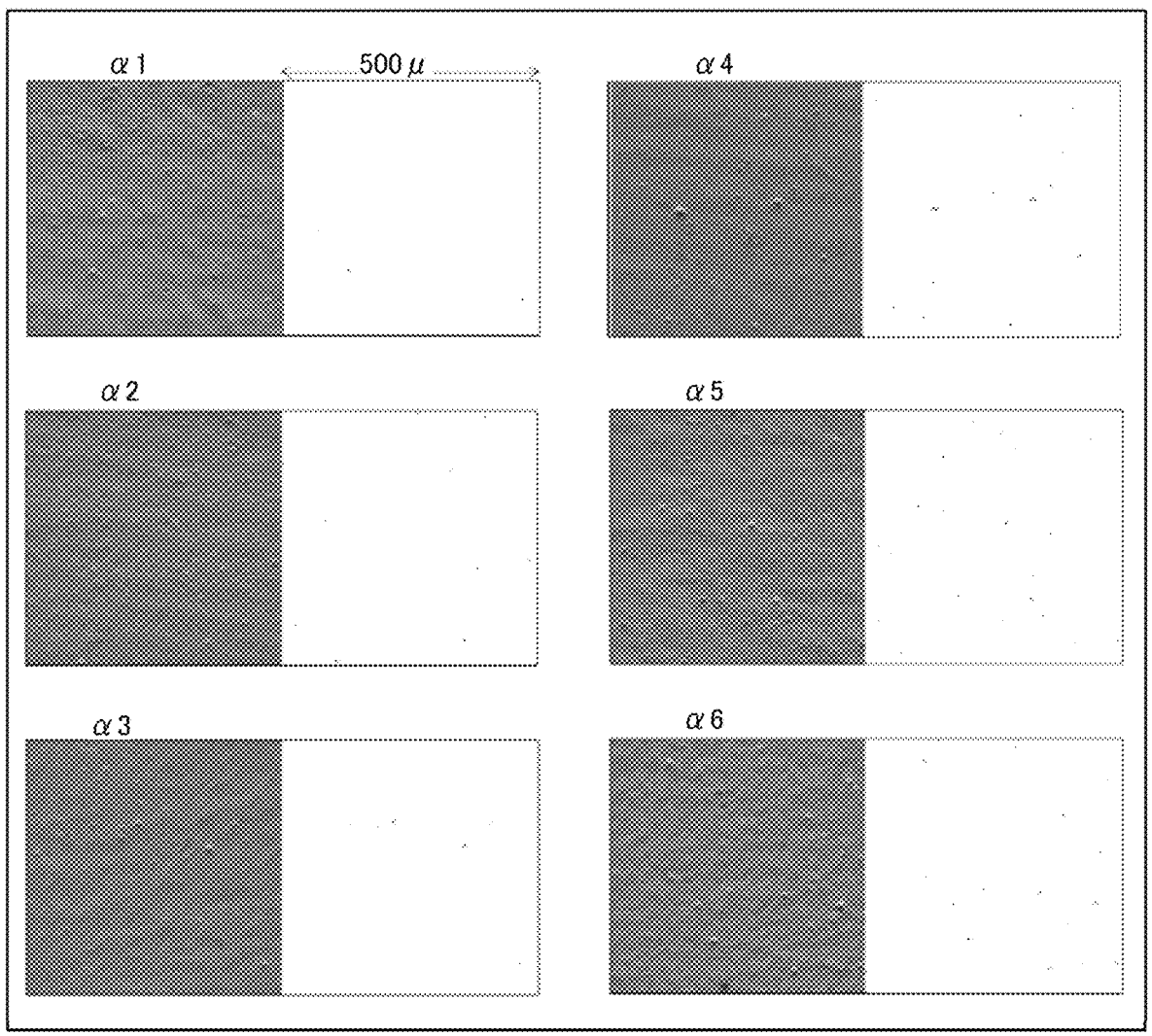
FIG. 7 shows a photographed image of the first surface of the resin base material of the example and an analyzed image showing the protrusions detected from the photographed image.

FIG. 6 shows the principle that minute protrusions and dents on the surface of the resin base material 120 can be detected in this measurement system. When the incident angle θ2 is made smaller than the measurement angle θ1 by the line camera, the image is visualized three-dimensionally in the protruding portion, where the upper direction is bright and the lower direction is dark. In the dent part, the top and bottom are upside down. It is presumed to be due to refraction similar to a spherical lens. Using this tendency, bright particles and dark particles are selected from the analysis image depending on the luminance, size, and roundness, respectively, and binarized, and the particles with bright top and dark bottom are extracted as protrusions, and the ferret diameter data of the extracted protrusions is obtained. FIG. 7 shows a photographed image of the first surface 21 of the resin base material 120 of the example and an analysis image obtained by extracting the protrusion portion by the above algorithm. From the ferret diameter data extracted in this way, the number of particles having a ferret diameter of 8 µm or more in the analysis image was counted, and the value converted into the number per $mm^2$ area was taken as the number of protrusions.

<Base Layer>

The base layer 140 is provided between the resin base material 120 and the inorganic oxide layer 150 or the oxygen barrier coating 130. The base layer 140 is a layer containing an organic polymer as the main component, and is sometimes referred to as a primer layer. By providing the base layer 140, the film formation property and the close adhesion strength of the inorganic oxide layer 150 or the oxygen barrier coating 130 can be improved.

The content of the organic polymer in the base layer 140 may be, for example, 70% by mass or more, or 80% by mass or more. The organic polymer includes, for example, polyacrylic resins, polyester resins, polycarbonate resins, polyurethane resins, polyamide resins, polyolefin resins, polyimide resins, melamine resins, phenol resins, and the like, and considering the hot water resistance of the close adhesion strength of the resin base material 120 with the inorganic oxide layer 150 or oxygen barrier coating 130, it is preferable to contain at least one of polyacrylic resins, polyol-based resins, polyurethane-based resins, polyamide-based resins, or reaction products of these organic polymers. Further, the base layer 140 may contain a silane coupling agent, an organic titanate or a modified silicone oil.

The organic polymer includes, more preferably, organic polymers having a urethane bond generated by a reaction of polyols having two or more hydroxyl groups at the end of the polymer with an isocyanate compound, and/or organic polymers containing a reaction product of polyols having two or more hydroxyl groups at the end of the polymer with an organic silane compound such as a silane coupling agent or a hydrolyzate thereof.

The polyol includes, for example, at least one selected from acrylic polyols, polyvinyl acetals, polystyryl polyols, polyurethane polyols, and the like. The acrylic polyol may be obtained by polymerizing an acrylic acid derivative monomer, or may be obtained by copolymerizing an acrylic acid derivative monomer with another monomer. The acrylic acid derivative monomer includes, for example, ethyl methacrylate, hydroxyethyl methacrylate, hydroxypropyl methacrylate, hydroxybutyl methacrylate, and the like. The monomer copolymerized with the acrylic acid derivative monomer includes, for example, styrene, and the like.

The isocyanate compound has an effect of enhancing the close adhesion between the resin base material 120 and the inorganic oxide layer 150 or the oxygen barrier coating 130 by a urethane bond generated by reacting with the polyol. That is, the isocyanate compound functions as a cross-linking agent or a curing agent. The isocyanate compound includes, for example, monomers such as aromatic tolylene diisocyanate (TDI) and diphenylmethane diisocyanate (MDI), aliphatic xylene diisocyanate (XDI), hexamethylene diisocyanate (HMDI) and isophorone diisocyanate (IPDI), and the like; polymers thereof; and derivatives thereof. The above-mentioned isocyanate compounds may be used alone or in combination of two or more.

The silane coupling agent includes, for example, vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, γ-methacryloxypropylmethyldimethoxysilane, and the like. The organic silane compound may be a hydrolyzate of these silane coupling agents. The organic silane compound may contain one of the above-mentioned silane coupling agent and its hydrolyzate alone or in combination of two or more.

The base layer 140 can be formed by blending the above-mentioned components in an organic solvent at an arbitrary ratio to prepare a mixed solution, and applying the mixed solution prepared on the first surface 21 of the resin base material 120. The mixed solution may contain, for example, a curing accelerator such as a tertiary amine, an imidazole derivative, a carboxylic acid metal salt compound, a quaternary ammonium salt, a quaternary phosphonium salt, and the like; an antioxidant such as a phenol-based, sulfur-based or phosphite-based antioxidant, and the like; a leveling agent; a flow regulator; a catalyst; a cross-linking reaction accelerator; a filler, and the like.

The mixed solution can be coated on the resin base material 120 by using well-known printing methods such as an offset printing method, a gravure printing method, a silk screen printing method, and the like, or well-known application methods such as roll coat, knife edge coat, gravure coat, and the like. After coating, the base layer 140 can be formed by heating to, for example, 50 to 200° C., drying and/or curing.

The thickness of the base layer 140 is not particularly limited and may be, for example, 0.005 to 5 µm. The thickness may be adjusted according to the application or the required characteristics. The thickness of the base layer 140 is preferably 0.01 to 1 µm, more preferably 0.01 to 0.5 µm. When the thickness of the base layer 140 is 0.01 µm or more, sufficient close adhesion strength between the resin base material 120 and the inorganic oxide layer 150 or the oxygen barrier coating 130 can be obtained, and the oxygen barrier property is also good. When the thickness of the base layer 140 is 1 µm or less, it is easy to form a uniform coated surface, and the drying load and the producing cost can be suppressed.

<Inorganic Oxide Layer>

The inorganic oxide layer 150 includes, for example, aluminum oxide, silicon oxide, magnesium oxide, titanium oxide, tin oxide, zinc oxide, indium oxide, and the like, and in particular, aluminum oxide or silicon oxide is preferable because productivity is excellent, and the oxygen barrier property and water vapor barrier property under heat resistance and moisture heat resistance are excellent. The inorganic oxide layer 150 may contain one of these materials alone or these materials in combination of two or more. The thickness of the inorganic oxide layer 150 is preferably 1 to 200 nm, and if the thickness is 1 nm or more, an excellent oxygen barrier property and an excellent water vapor barrier property can be obtained, while if the thickness is 200 nm or less, the producing cost can be kept low, and at the same time, cracks due to external forces such as bending and pulling are unlikely to occur, and deterioration of the barrier property can be suppressed. The inorganic oxide layer 150 can be formed, for example, by known film formation methods such as a vacuum vapor deposition method, a sputtering method, an ion plating method, a plasma vapor phase growth method (CVD), and the like.

<Oxygen Barrier Coating>

The oxygen barrier coating 130 may be one known as an oxygen bather coating formed by a wet coat method. The oxygen barrier coating 130 is obtained by forming a coating film made of a coating agent on the base layer 140 or the inorganic oxide layer 150 by a wet coat method and drying the coating film. The coating film is a wet coating, and the coating is a dry coating.

As the oxygen barrier coating 130, a coating containing at least one of a metal alkoxide and its hydrolyzate or a reaction product thereof, and a water-soluble polymer (organic-inorganic composite coating) is preferable. Further, a coating further containing at least one of a silane coupling agent and a hydrolyzate thereof is preferable.

The metal alkoxide and its hydrolyzate contained in the organic-inorganic composite coating include, for example, those represented by the general formula $M(OR)_n$, such as tetraethoxysilane $[Si(OC_2H_5)_4]$, triisopropoxyaluminum $[Al(OC_3H_7)_3]$, and the like, and their hydrolysates. One of these may be contained alone or these may be contained in combination of two or more.

The total content of at least one of the metal alkoxide and its hydrolyzate or the reaction product thereof in the organic-inorganic composite coating is, for example, 40 to 70% by mass. From the viewpoint of further reducing the oxygen permeability, the lower limit of the total content of at least one of the metal alkoxide and its hydrolyzate or the reaction product thereof in the organic-inorganic composite coating may be 50% by mass. From the same viewpoint, the upper limit of the total content of at least one of the metal alkoxide and its hydrolyzate or the reaction product thereof in the organic-inorganic composite coating may be 65% by mass.

The water-soluble polymer contained in the organic-inorganic composite coating is not particularly limited, and examples thereof include polyvinyl alcohol-based polymers, polysaccharides such as starch, methyl cellulose, carboxymethyl cellulose, and the like, and polymers such as acrylic polyol-based polymers, and the like. From the viewpoint of further improving the oxygen gas barrier property, the water-soluble polymer preferably contains a polyvinyl alcohol-based polymer. The number average molecular weight of the water-soluble polymer is, for example, 40,000 to 180,000.

The polyvinyl alcohol-based water-soluble polymer can be obtained, for example, by saponifying (including partially saponifying) polyvinyl acetate. This water-soluble polymer may be one in which dozens % of acetic acid groups remain, or may be one in which only a few percent of acetic acid groups remain.

The content of the water-soluble polymer in the organic-inorganic composite coating is, for example, 15 to 50% by mass. The lower limit of the content of the water-soluble polymer in the organic-inorganic composite coating may be 20% by mass from the viewpoint of further reducing the oxygen permeability. The upper limit of the content of the water-soluble polymer in the organic-inorganic composite coating may be 45% by mass from the viewpoint of further reducing the oxygen permeability.

The silane coupling agent and its hydrolyzate contained in the organic-inorganic composite coating include silane coupling agents having an organic functional group. Such a silane coupling agent and its hydrolyzate include ethyltrimethoxysilane, vinyltrimethoxysilane, γ-chloropropylmethyldimethoxysilane, γ-chloropropyltrimethoxysilane, glycidoxypropyltrimethoxysilane, γ-methyloxypropyltrimethoxysilane, γ-methacryloxyprepylmethyldimethoxysilane, and hydrolyzates thereof. One of these may be contained alone or these may be contained in combination of two or more.

As at least one of the silane coupling agent and its hydrolyzate, it is preferable to use one having an epoxy group as the organic functional group. The silane coupling agent having an epoxy group includes, for example, γ-glycidoxypropyltrimethoxysilane and β-(3,4-epoxycyclohexyl)ethyltrimethoxysilane. The silane coupling agent having an epoxy group and its hydrolyzate may have an organic functional group different from the epoxy group, such as a vinyl group, an amino group, a methacrylic group or a ureyl group.

The silane coupling agent having an organic functional group and its hydrolyzate can further improve the oxygen bather property of the oxygen barrier coating 130 and the adhesiveness to the base layer 140 or the inorganic oxide layer 150 due to the interaction between the organic functional group and a hydroxyl group of the water-soluble polymer. In particular, an epoxy group of the silane coupling agent and its hydrolyzate and a hydroxyl group of the polyvinyl alcohol can interact with each other to form an oxygen barrier coating 130 having a particularly excellent oxygen barrier property and close adhesion to the base layer 140 or the inorganic oxide layer 150.

The total content of at least one of the silane coupling agent and its hydrolyzate or its reaction product in the organic-inorganic composite coating is, for example, 1 to 15% by mass. From the viewpoint of further reducing the oxygen permeability, the lower limit of the total content of at least one of the silane coupling agent and its hydrolyzate or its reaction product in the organic-inorganic composite coating may be 2% by mass. From the same viewpoint, the upper limit of the total content of at least one of the silane coupling agent and its hydrolyzate or its reaction product in the organic-inorganic composite coating may be 12% by mass.

The organic-inorganic composite coating may contain a crystalline inorganic layered compound having a layered structure. The inorganic layered compound includes, for example, clay minerals typified by kaolinite, smectite, mica, and the like. One of these may be used alone or these may be used in combination of two or more. The particle size of the inorganic layered compound is, for example, 0.1 to 10 μm. The aspect ratio of the inorganic layered compound is, for example, 50 to 5000.

As the inorganic layered compound, a smectite group clay mineral is preferable because a coating having an excellent oxygen barrier property and close adhesion strength can be formed by intercalation of a water-soluble polymer between layers of the layered structure. Specific examples of smectite group clay minerals include montmorillonite, hectorite, and saponite, and water-swellable synthetic mica, and the like.

Further, as another preferable example of the oxygen barrier coating 130, a coating containing a polyvalent metal salt of a carboxylic acid, which is a reaction product of a carboxy group of the polycarboxylic acid-based polymer (A) and the polyvalent metal compound (B) (polycarboxylic acid polyvalent metal salt coating) is mentioned. In this case, it may be a polycarboxylic acid polyvalent metal salt coating formed by applying a coating agent in which a polycarboxylic acid-based polymer (A) and a polyvalent metal compound (B) are mixed and heating and drying the agent, or may be a polycarboxylic acid polyvalent metal salt coating formed by applying a coating agent containing the polycarboxylic acid-based polymer (A) as the main component and drying the agent to form a coating A, and applying a coating agent containing the polyvalent metal compound (B) as the main component and drying the agent to form a coating B thereon, and performing a cross-linking reaction between the A/B layers.

[Polycarboxylic Acid-Based Polymer (A)]

The polycarboxylic acid-based polymer is a polymer having two or more carboxy groups in the molecule. The polycarboxylic acid-based polymer includes, for example, (co)polymers of ethylenically unsaturated carboxylic acids; copolymers of ethylenically unsaturated carboxylic acids and other ethylenically unsaturated monomers; and acidic polysaccharides having a carboxyl group in the molecule such as alginic acid, carboxymethyl cellulose, pectin, and the like. The ethylenically unsaturated carboxylic acid includes, for example, acrylic acid, methacrylic acid, itaconic acid, maleic acid, fumaric acid, crotonic acid, and the like. The ethylenically unsaturated monomer copolymerizable with the ethylenically unsaturated carboxylic acid includes, for example, ethylene, propylene, saturated carboxylic acid vinyl esters such as vinyl acetate, and the like, alkyl acrylates, alkyl methacrylates, alkyl itaconates, vinyl chloride, vinylidene chloride, styrene, acrylamide, acrylonitrile, and the like. These polycarboxylic acid-based polymers may be used alone or in combination of two or more.

As the component, among the above, polymers containing a constitutional unit derived from at least one polymerizable monomer selected from the group consisting of acrylic acid, maleic acid, methacrylic acid, itaconic acid, fumaric acid and crotonic acid are preferable, and polymers containing a constitutional unit derived from at least one polymerizable monomer selected from the group consisting of acrylic acid, maleic acid, methacrylic acid and itaconic acid are particularly preferable, from the viewpoint of the gas barrier property of the obtained gas barrier film. In the polymer, the proportion of the constitutional unit derived from at least one polymerizable monomer selected from the group consisting of acrylic acid, maleic acid, methacrylic acid and itaconic acid is preferably 80 mol % or more, and more preferably 90 mol % or more (however, the sum of all constitutional units constituting the polymer is taken as 100 mol %). The polymer may be a homopolymer or a copolymer. When the polymer is a copolymer containing a constitutional unit other than the above-mentioned constitutional unit, the other constitutional unit includes, for example, constitutional units derived from an ethylenically unsaturated monomer capable of copolymerizing with the above-mentioned ethylenically unsaturated carboxylic acid, and the like.

The number average molecular weight of the polycarboxylic acid-based polymer is preferably in the range of 2,000 to 10,000,000, more preferably 5,000 to 1,000,000. If the number average molecular weight is less than 2,000, the obtained gas barrier film cannot achieve sufficient water resistance, and moisture may deteriorate the gas barrier property and transparency, or whitening may occur. On the other hand, if the number average molecular weight exceeds 10,000,000, the viscosity of the coating agent for forming the oxygen barrier coating 130 becomes high, and the coatability may be impaired. The number average molecular weight is a polystyrene-equivalent number average molecular weight determined by gel permeation chromatography (GPC).

When a coating agent containing the polycarboxylic acid-based polymer (A) as the main component is applied and dried to form a coating A before forming a coating B, a part of the carboxy group in the polycarboxylic acid-based polymer may be neutralized with a basic compound in advance. By neutralizing a part of the carboxy group of the polycarboxylic acid-based polymer in advance, the water resistance and heat resistance of the coating A can be further improved. As the basic compound, at least one basic compound selected from the group consisting of a polyvalent metal compound, a monovalent metal compound and ammonia is preferable. As the polyvalent metal compound, compounds exemplified in the description of the polyvalent metal compound (B) described later can be used. The monovalent metal compound includes, for example, sodium hydroxide, potassium hydroxide, and the like.

Various additives can be added to a coating agent containing the polycarboxylic acid-based polymer (A) as the main component, and include cross-linking agents, curing agents, leveling agents, defoaming agents, anti-blocking agents, antistatic agents, dispersants, surfactants, softeners, stabilizers, film-forming agents, thickeners, and the like. as long as the barrier performance is not impaired.

The solvent used for the coating agent containing the polycarboxylic acid-based polymer (A) as the main component is preferably an aqueous medium. The aqueous medium includes water, water-soluble or hydrophilic organic solvents, or mixtures thereof. The aqueous medium usually contains water or water as the main component. The content of water in the aqueous medium is preferably 70% by mass or more, more preferably 80% by mass or more. The water-soluble or hydrophilic organic solvent includes, for example, alcohols such as methanol, ethanol, isopropanol, and the like, ketones such as acetone, methyl ethyl ketone, and the like, ethers such as tetrahydrofuran, and the like, cellosolves, carbitols, nitriles such as acetonitrile, and the like: etc.

[Polyvalent Metal Compound (B)]

The polyvalent metal compound is not particularly limited as long as it is a compound that reacts with a carboxyl group of a polycarboxylic acid-based polymer to form a polyvalent metal salt of the polycarboxylic acid, and includes zinc oxide particles, magnesium oxide particles, magnesium methoxide, copper oxide, calcium carbonate, and the like. These may be used alone or in admixture. Zinc oxide is preferable from the viewpoint of the oxygen barrier property of the oxygen bather coating.

Zinc oxide is an inorganic material having an ultraviolet absorbing ability, and the average particle size of zinc oxide particles is not particularly limited, but the average particle size is preferably 5 μm or less, more preferably 1 μm or less, and particularly preferably 0.1 μm or less from the viewpoint of a gas barrier property, transparency, and coating suitability.

When a coating agent containing the polyvalent metal compound (B) as the main component is applied and dried to form a coating B, various additives may be contained if necessary, in addition to zinc oxide particles, as long as the effect of the present disclosure is not impaired. As the additives, a resin that is soluble or dispersible in the solvent used for the coating agent, a dispersant that is soluble or dispersible in the solvent, a surfactant, a softener, a stabilizer, a film-forming agent, a thickener, and the like may be contained.

Among the above, it is preferable to contain a resin that is soluble or dispersible in the solvent used for the coating agent. This improves the coatability and film-formability of the coating agent. Examples of such resins include alkyd resins, melamine resins, acrylic resins, urethane resins, polyester resins, phenol resins, amino resins, fluororesins, epoxy resins, isocyanate resins, and the like.

Further, it is preferable to contain a dispersant that is soluble or dispersible in the solvent used for the coating agent. This improves the dispersibility of the polyvalent metal compound. As the dispersant, an anionic surfactant or a nonionic surfactant can be used. The surfactant includes various surfactants such as (poly)carboxylic acid salt, alkyl sulfate ester salt, alkylbenzene sulfonic acid salt, alkylnaphthalene sulfonic acid salt, alkylsulfosuccinic acid salt, alkyldiphenylether disulfonic acid salt, alkylphosphoric acid salt, aromatic phosphate ester, polyoxyethylene alkyl ether, polyoxyethylene alkylphenol ether, polyoxyethylene alkyl ester, alkylallyl sulfate ester salt, polyoxyethylene alkyl phosphate ester, sorbitan alkyl ester, glycerin fatty acid ester, sorbitan fatty acid ester, sucrose fatty acid ester, polyethylene glycol fatty acid ester, polyoxyethylene sorbitan alkyl ester, polyoxyethylene alkyl allyl ether, polyoxyethylene derivative, polyoxyethylene sorbitol fatty acid ester, polyoxy fatty acid ester, polyoxyethylene alkylamine, and the like. These surfactants may be used alone or in combination of two or more.

When the coating agent containing the polyvalent metal compound (B) as the main component contains an additive, the mass ratio of the polyvalent metal compound to the additive (polyvalent metal compound:additive) is preferably in the range of 30:70 to 99:1, and preferably in the range of 50:50 to 98:2.

The solvent used for the coating agent containing the polyvalent metal compound (B) as the main component includes, for example, water, methyl alcohol, ethyl alcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethyl ether, dioxane, tetrahydrofuran, ethyl acetate and butyl acetate. In addition, these solvents may be used alone or in combination of two or more. Among these, methyl alcohol, ethyl alcohol, isopropyl alcohol, toluene, ethyl acetate, methyl ethyl ketone and water are preferable from the viewpoint of coatability. Further, from the viewpoint of productivity, methyl alcohol, ethyl alcohol, isopropyl alcohol and water are preferable.

When a coating agent in which the polycarboxylic acid-based polymer (A) and the polyvalent metal compound (B) are mixed is applied and dried to form a polycarboxylic acid polyvalent metal salt coating, the polycarboxylic acid polyvalent metal salt coating can be formed by mixing the above-mentioned polycarboxylic acid-based polymer (A), the above-mentioned polyvalent metal compound (B), and water or alcohol as a solvent, a resin and a dispersant that can be dissolved or dispersed in the solvent, and if necessary, additives to prepare a coating agent, and applying the agent by a known coat method and drying it. The coat method includes, for example, a casting method, a dipping method, a roll coat method, a gravure coat method, a screen printing method, a reverse coat method, a spray coat method, a kit coat method, a die coat method, a metering bar coat method, a chamber doctor combined coat method, a curtain coat method, and the like.

The thickness of the oxygen barrier coating 130 is set according to the required oxygen barrier property, and may be, for example, 0.05 to 5 μm. The thickness of the oxygen barrier coating 130 is preferably 0.05 to 1 μm, more preferably 0.1 to 0.5 μm. When the thickness of the oxygen barrier coating 130 is 0.05 μm or more, a sufficient oxygen barrier property can be easily obtained. When the thickness of the oxygen barrier coating 130 is 1 μm or less, it is easy to form a uniform coated surface, and the drying load and the producing cost can be suppressed.

The gas barrier film having the organic-inorganic composite coating or the polycarboxylic acid polyvalent metal salt coating as the oxygen barrier coating 130 shows an excellent oxygen barrier property even after boil treatment or retort sterilization treatment, and even when laminated with a sealant film to provide a wrapping material for boiling and retort treatment, has sufficient close adhesion strength and sealing strength, and further, has transparency not found in metal foils and metal vapor-deposited coatings, and has excellent bending resistance and stretch resistance, and has an advantage of no risk of generation of harmful substances such as dioxin and the like, and other advantages.

[Producing Method of Gas Barrier Film]

The gas barrier film 101 can be produced by forming either one of a base layer 140 and an inorganic oxide layer 150 or both a base layer 140 and an inorganic oxide layer 150 on the first surface 21 of a resin base material 120, and then forming an oxygen barrier coating 130 on the base layer 140 or the inorganic oxide layer 150. The method for producing the gas barrier film 101 of the present disclosure includes, for example, a sorting step, a base layer forming step, an inorganic oxide layer forming step, and an oxygen barrier coating forming step.

The sorting step includes a step of sorting a resin base material on which the density of protrusions having a ferret diameter of 8 μm or more on the surface is 20 pieces/mm$^2$ or less as the resin base material 120. The number of protrusions on the surface of the resin base material is measured by the same method as the method for measuring the number of protrusions on the first surface 21 of the resin base material 120 described above. As the resin base material 120, a commercially available product may be used, or a product produced by a known method may be used.

The base layer forming step includes, for example, a step of applying a coating agent to at least the first surface 21 of the resin base material 120 by a wet coat method to form a coating film, and drying the coating film (removing the solvent) to form a base layer 140. As the method for applying a coating agent, a known wet coat method can be used. The wet coat method includes a roll coat method, a gravure coat method, a reverse coat method, a die coat method, a screen printing method, a spray coat method, and the like. As the method for drying the coating film made of a coating agent, known drying methods such as hot air drying, hot roll drying, infrared irradiation, and the like can be used. The drying conditions include, for example, conditions at 90° C. for 10 seconds.

The inorganic oxide layer forming step includes, for example, a step of forming an inorganic oxide layer 150 on the first surface 21 of the resin base material 120 or on the base layer 140 by the above-described vacuum vapor deposition method, sputtering method, ion plating method, plasma vapor phase growth method (CVD) or the like.

The oxygen barrier coating forming step includes, for example, a step of applying a coating agent on the base layer 140 or the inorganic oxide layer 150 by a wet coat method to form a coating film, and drying the coating film (removing the solvent) to form an oxygen barrier coating 130. As the method for applying a coating agent, a known wet coat method can be used. The wet coat method includes a roll coat method, a gravure coat method, a reverse coat method, a die coat method, a screen printing method, a spray coat method, and the like. As the method for drying the coating film made of a coating agent, known drying methods such as hot air drying, hot roll drying, infrared irradiation, and the like can be used. The drying conditions include, for example, conditions at 90° C. for 10 seconds. The oxygen barrier coating 130 may be formed by one-time application and drying, or may be formed by repeating application and drying a plurality of times with the same kind of coating agent or different kinds of coating agents.

When the method for producing the gas barrier film 101 of the present disclosure includes a sorting step, the resin base material 120 on which the density of protrusions having a ferret diameter of 8 μm or more on the surface is 20 pieces/mm² or less can be efficiently applied. Therefore, by having the sorting step, the gas barrier film having a further improved oxygen barrier property can be efficiently produced. In addition, by having the sorting step, the gas bather film 101 having good printability can be efficiently produced.

The gas barrier film 101 of the present disclosure may further include a printing layer, a protective layer, a light-shielding layer, an adhesive layer, a heat-sealable heat fusion layer, and other functional layers, if necessary. When the gas barrier film 101 of the present disclosure has a heat-sealable heat fusion layer, the heat fusion layer is arranged on at least one outermost surface layer of the gas barrier film 101. Since the gas barrier film 101 has a heat fusion layer, the gas barrier film 101 is one (for example, a package or a lid) that can be sealed by a heat seal. The heat fusion layer, for example, can be laminated on a laminate obtained by forming the base layer 140, the inorganic oxide layer 150, and the oxygen barrier coating 130 of the present embodiment on one or both sides of the resin base material 120, by a known dry lamination method, extrusion lamination method or the like using a known adhesive such as a polyurethane-based, polyester-based or polyether-based adhesive, and the like.

<Action and Effect>

In the gas barrier film 101 of the present disclosure, the resin layer forming the first surface 21 is made of a polyolefin-based copolymer resin, and on the first surface 21 of the resin base material 120 on which the density of protrusions having a ferret diameter of 8 μm or more measured by the above-described measuring method is 20 pieces/mm² or less, either the base layer 140 or the inorganic oxide layer 150, or both the base layer 140 and the inorganic oxide layer 150 are laminated, and further, the oxygen barrier coating 130 is laminated. In the gas barrier film 101 of the present disclosure, the surface layer 23 is made of a polyolefin-based copolymer resin, and on the resin base material 120 on which the density of protrusions having a ferret diameter of 8 μm or more is 20 pieces/mm² or less, the oxygen barrier coating 130 is formed via one or both of the base layer 140 and the inorganic oxide layer 150, therefore, coating defects due to large protrusions on the surface of the base material are less likely to occur, the oxygen barrier property can be improved, and close adhesion of the oxygen barrier coating 130 can be improved. In addition, in the gas barrier film 101 of the present disclosure, it is not necessary to unnecessarily increase the thickness of the base layer 140, the inorganic oxide layer 150, and the oxygen bather coating 130, so that productivity can be improved and the amount of material used can be reduced. Therefore, by using the gas barrier film 101 of the present disclosure as a packaging material, it is possible to have sufficient lamination strength as a packaging material and to improve the quality retention of the contents at low cost.

EXAMPLES

Hereinafter, Embodiments of the present disclosure will be described in more detail with reference to Examples and Comparative Examples. However, the present disclosure is not limited to the following examples.

The materials used in each of the following examples are shown below.

[Material Used]

<Resin Base Material>

α1: Biaxially stretched polypropylene film (trade name: M-1, thickness 20 μm, single-sided corona treatment, manufactured by Mitsui Chemicals Tohcello, Inc.).

α2: Biaxially stretched polypropylene film (trade name: ME-1, thickness 20 μm, single-sided corona treatment, manufactured by Mitsui Chemicals Tohcello, Inc.).

α3: Biaxially stretched polypropylene film (trade name: TS18TI-TPN, thickness 18 am, single-sided corona treatment, manufactured by Max Speciality Films Limited).

α4: Biaxially stretched polypropylene film (trade name: P2111, thickness 20 μm, single-sided corona treatment, manufactured by Toyobo Co., Ltd.).

α5: Biaxially stretched polypropylene film (trade name: P2171, thickness 20 μm, single-sided corona treatment, manufactured by Toyobo Co., Ltd.).

α6: Biaxially stretched polypropylene film (trade name: P2102, thickness 20 μm, single-sided corona treatment, manufactured by Toyobo Co., Ltd.).

α7: Biaxially stretched polypropylene film (trade name: P2161, thickness 20 μm, single-sided corona treatment, manufactured by Toyobo Co., Ltd.).

α8: Biaxially stretched polypropylene film (trade name: VPH2011, thickness 20 μm, single-sided corona treatment, AB agent average particle size 2 μm on the corona-treated surface side, manufactured by A.J. Plast).

α9: Biaxially stretched polypropylene film (trade name: VPH2011, thickness 20 μm, single-sided corona treatment, AB agent average particle size 4 μm on the corona-treated surface side, manufactured by A.J. Plast).

α10: Biaxially stretched polypropylene film (trade name: PB210J, thickness 20 μm, single-sided corona treatment, manufactured by Futamura Chemical Co., Ltd.).

α11: Polyethylene terephthalate film (trade name: P60, thickness 12 μm, single-sided corona treatment, manufactured by Toray Industries, Inc.).

α12: Polyethylene terephthalate film (trade name: E5102, thickness 12 μm, single-sided corona treatment, manufactured by Toyobo Co., Ltd.).

α13: Polyethylene film (trade name: HD, thickness 40 μm, single-sided corona treatment, manufactured by Tamapoly Co., Ltd.).

α14: Polyethylene film (trade name: HS31, thickness 30 μm, single-sided corona treatment, manufactured by Tamapoly Co., Ltd.).

α15: Linear low-density polyethylene film (trade name: UB-3, thickness 40 μm, single-sided corona treatment, manufactured by Tamapoly Co., Ltd.).

α16: Polyethylene film (trade name: PE3K-H, thickness 25 μm, single-sided corona treatment, manufactured by Futamura Chemical Co., Ltd.).

α17: Polyethylene film (trade name: PE3M, thickness 25 μm, single-sided corona treatment, manufactured by Futamura Chemical Co., Ltd.).

α18: Linear low-density polyethylene film (trade name: LL-XHT, thickness 25 μm, single-sided corona treatment, manufactured by Futamura Chemical Co., Ltd.).

α19: Linear low-density polyethylene film (trade name: LL-RP2, thickness 25 μm, single-sided corona treatment, manufactured by Futamura Chemical Co., Ltd.).

α20: Polyethylene film (thickness 25 μm, single-sided corona treatment, manufactured by WINPAK Limited).

Production Example 1

Acridic CL-1000 (manufactured by DIC Corporation) as an acrylic polyol and TDI type curing agent Coronate 2030 (manufactured by Tosoh Corporation) as an isocyanate-based compound were used and blended so that the blending ratio of the acrylic polyol and the isocyanate-based compound was 6:4 in terms of solid content weight ratio, to prepare a mixed solution (solid content: 2% by mass) for forming a base layer using a diluting solvent (ethyl acetate).

Production Example 2

To 20 parts by mass of an aqueous polyacrylic acid solution having a number average molecular weight of 200,000 (Aron A-10H manufactured by Toagosei Co., Ltd., solid content concentration 25% by mass) was added 58.9 parts by mass of distilled water for dilution. Then, 0.44 parts by mass of aminopropyltrimethoxysilane (APTMS manufactured by Aldrich) was added and the mixture was stirred to make the solution uniform, thereby preparing a coating agent containing the polycarboxylic acid-based polymer as the main component.

Production Example 3

A coating agent containing a polyvalent metal compound as the main component was prepared by mixing 100 parts by mass of an aqueous dispersion of zinc oxide fine particles (ZE143 manufactured by Sumitomo Osaka Cement Co., Ltd.) and 2 parts by mass of a curing agent Liofol HAERTER UR 5889-21 (manufactured by Henkel).

Production Example 4

An aqueous solution containing a polyvinyl alcohol resin (PVA, trade name: POVAL PVA-105, manufactured by Kuraray Co., Ltd., polyvinyl alcohol with a saponification degree of 98 to 99% and a polymerization degree of 500) dissolved, and aqueous solutions in which tetraethoxysilane (TEOS), and γ-glycidoxypropyltrimethoxysilane (GPTMS, trade name: KBM-403 manufactured by Shin-Etsu Chemical Co., Ltd.) are hydrolyzed with 0.02 mol/L hydrochloric acid, respectively, were prepared, and the aqueous solutions were blended so that PVA:TEOS:GPTMS was 40:50:10 in terms of weight ratio before hydrolysis. Further, a diluting solvent was added so that the solvent component of the blended aqueous solution had a mass ratio of water:isopropyl alcohol of 90:10, to prepare a coating agent (5% by mass) for forming an organic-inorganic composite coating.

[Measurement of Black Area Ratio of Resin Base Material]

For the surface on the corona-treated surface side of the resin base materials α1 to 12, the black area ratio was determined according to the above-mentioned image acquisition conditions and image analysis conditions. The results are shown in Table 1. An optical microscope OLS-4000 manufactured by Olympus Corporation and an objective lens 10× (MPFLN10) were used for measuring the black area ratio, and Scion ImageJ manufactured by Scion Corporation was used as image analysis software.

Examples 1-1 to 1-8 and Comparative Examples 1-1 to 1-4

The mixed solution for forming a base layer prepared in Production Example 1 was applied onto the corona-treated surface of the resin base material described in Table 1 using a gravure printing machine to form a coating film, which was then dried by passing through an oven at 100° C. for 10 seconds, to form a base layer having a thickness of 0.1 μm. Next, a coating agent containing the polycarboxylic acid-based polymer prepared in Production Example 2 as the main component was applied onto the formed base layer using a gravure printing machine to form a coating film, which was then dried by passing through an oven at 100° C. for 10 seconds to form a polycarboxylic acid-based polymer coating having a thickness of 0.2 μm, and further, a coating agent containing the polyvalent metal compound prepared in Production Example 3 as the main component was applied onto the polycarboxylic acid-based polymer coating using a gravure printing machine to form a coating film, which was then dried by passing through an oven at 100° C. for 10 seconds to form a polyvalent metal compound coating having a thickness of 0.2 μm, thereby forming an oxygen barrier coating composed of the polycarboxylic acid polyvalent metal salt coating, thus, gas barrier films of Examples 1-1 to 1-8 and Comparative Examples 1-1 to 1-4 were obtained.

<Evaluation of Printability>

A black ink (trade name: N920LPGT, manufactured by Toyo Ink Co., Ltd.) was gradation-printed on the oxygen bather coating of the gas bather film of each example at a halftone dot density of 5% to 50% (in 5% increments) using a gravure printing machine. The ink viscosity was 14 seconds (Zahn cup #3, 25° C.). The printing speed was 150 m/min and the drying temperature was 50° C. The surface after printing was observed with an optical microscope, and the dot missing portion was counted. The judgment was ○ if there were less than 5 dot missing portions in the 6 mm square area, Δ if there were 5 to 20 dot missing portions, and x if there were 21 or more dot missing portions. The determination results are shown in Table 1.

Note that "dot missing" refers to a state in which the ink is poorly deposited on the film base material and the dots (halftone dots) are not partially transferred. The smaller the number of the dot missing portion until a state where the halftone dot density is low, the better the printability of the highlighted portion.

<Evaluation of Oxygen Barrier Property, and Water Vapor Barrier Property after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive and a polypropylene film Trefan ZK93KM (60 μm) manufactured by Toray Advanced Film Co., Ltd. as the CPP, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side.

An A5 size 4-way seal pouch was made from the obtained gas barrier laminated film, filled with 150 ml of tap water as the content, and heat sterilized (retort treatment) for 30 minutes in hot water at 120° C.

For the gas barrier laminated film after the retort treatment, the oxygen permeability $cm^3/(m^2 \cdot day \cdot atm)$ was measured in an atmosphere of 30° C. and 70% RH using an oxygen permeability measuring device (trade name: OXTRAN-2/20, manufactured by MOCON, Inc.). Further, the water vapor permeability $(g/(m^2\ day))$ was measured in an atmosphere of 40° C. and 90% RH using a water vapor permeability measuring device (trade name: PERMATRAN-W-3/33, manufactured by MOCON, Inc.). The measurement results are shown in Table 1.

higher over 0.15%, the oxygen permeability increased, and a better oxygen barrier property could not be obtained as compared with Examples 1-1 to 1-8.

According to the results described in Table 1, the gas barrier films of Examples 1-1 to 1-8 had a printability of "○" with a halftone dot density of 30% or more.

On the other hand, the gas bather films of Comparative Examples 1-1 to 1-4 had a printability of "x" with a halftone dot density of 30%.

As described above, it was found that the printability is good when the black area ratio is 0.15% or less.

Examples 2-1 to 2-6 and Comparative Examples 2-1 to 2-4

The mixed solution for forming a base layer prepared in Production Example 1 was applied onto the corona-treated

TABLE 1

| | resin base material | | | | gas barrier property | | | | | | | | |
|---|---|---|---|---|---|---|---|---|---|---|---|---|---|
| | | black area ratio | base | inorganic oxide | oxygen barrier | oxygen permeability $[cm^3/(m^2 \cdot$ | water vapor permeability $[g/(m^2 \cdot$ | | | printability halftone dot concentration (%) | | | | |
| | type | [%] | layer | layer | coating | day atm)] | day)] | 15 | 20 | 25 | 30 | 35 | 40 | 45 | 50 |
| Examples 1-1 | α1 | 0.04 | present | none | polycarboxylic acid polyvalent metal salt coating | 0.7 | 2.6 | x | x | Δ | ○ | ○ | ○ | ○ | ○ |
| Examples 1-2 | α2 | 0.04 | present | none | polycarboxylic acid polyvalent metal salt coating | 0.4 | 2.9 | x | x | Δ | ○ | ○ | ○ | ○ | ○ |
| Examples 1-3 | α3 | 0.00 | present | none | polycarboxylic acid polyvalent metal salt coating | 0.4 | 3.0 | x | x | Δ | ○ | ○ | ○ | ○ | ○ |
| Examples 1-4 | α4 | 0.00 | present | none | polycarboxylic acid polyvalent metal salt coating | 1.3 | 2.7 | x | x | Δ | ○ | ○ | ○ | ○ | ○ |
| Examples 1-5 | α8 | 0.11 | present | none | polycarboxylic acid polyvalent metal salt coating | 1.2 | 3.0 | x | x | Δ | ○ | ○ | ○ | ○ | ○ |
| Examples 1-6 | α10 | 0.03 | present | none | polycarboxylic acid polyvalent metal salt coating | 1.4 | 3.0 | x | x | Δ | ○ | ○ | ○ | ○ | ○ |
| Examples 1-7 | α11 | 0.06 | present | none | polycarboxylic acid polyvalent metal salt coating | 0.1 | 4.5 | Δ | Δ | ○ | ○ | ○ | ○ | ○ | ○ |
| Examples 1-8 | α12 | 0.11 | present | none | polycarboxylic acid polyvalent metal salt coating | 0.2 | 4.6 | Δ | Δ | ○ | ○ | ○ | ○ | ○ | ○ |
| Comparative Example 1-1 | α5 | 0.17 | present | none | polycarboxylic acid polyvalent metal salt coating | 3.9 | 2.8 | x | x | x | x | Δ | ○ | ○ | ○ |
| Comparative Example 1-2 | α9 | 0.38 | present | none | polycarboxylic acid polyvalent metal salt coating | 2.6 | 3.0 | x | x | x | x | Δ | ○ | ○ | ○ |
| Comparative Example 1-3 | α6 | 0.84 | present | none | polycarboxylic acid polyvalent metal salt coating | 5.8 | 2.9 | x | x | x | x | Δ | Δ | ○ | ○ |
| Comparative Example 1-4 | α7 | 0.39 | present | none | polycarboxylic acid polyvalent metal salt coating | 6.2 | 2.9 | x | x | x | x | Δ | ○ | ○ | ○ |

According to the results described in Table 1, the gas barrier films of Examples 1-1 to 1-8 had a black area ratio of 0.15% or less and a value of the oxygen permeability in an atmosphere of 30° C. and a relative humidity of 70% of 2 $cm^3/(m^2 \cdot day \cdot atm)$ or less, thus, a good oxygen barrier property was obtained.

On the other hand, the gas bather films of Comparative Examples 1-1 to 1-4 had a black area ratio of 0.15% or more and a value of the oxygen permeability of more than 2 $cm^3/(m^2 \cdot day \cdot atm)$, thus, since the black area ration was surface of the resin base material described in Table 2 using a gravure printing machine to form a coating film, which was then dried by passing through an oven at 100° C. for 10 seconds, to form a base layer having a thickness of 0.1 μm. Next, using a vacuum vapor deposition apparatus according to an electron beam heating mode, a mixed material containing two or more of metallic silicon, silicon monoxide, and silicon dioxide was evaporated, and an inorganic oxide layer made of silicon oxide having a thickness of 30 nm was formed on the base layer. Subsequently, a coating agent for forming an organic-inorganic composite coating prepared in Production Example 4 was applied onto the formed inorganic oxide layer using a gravure printing machine to form a coating film, which was then dried by passing through an oven at 100° C. for 10 seconds to form an oxygen bather coating composed of an organic-inorganic composite coating having a thickness of 0.3 μm, thus, gas bather films of Examples 2-1 to 2-6 and Comparative Examples 2-1 to 2-4 are were obtained.

Example 2-7

A gas barrier film of Example 2-7 was obtained in the same manner as in Example 2-3 except that the inorganic oxide layer was directly formed on the corona-treated surface of the resin base material α8 without providing the base layer.

<Evaluation of Printability>

A black ink (trade name: N920LPGT, manufactured by Toyo Ink Co., Ltd.) was gradation-printed on the oxygen bather coating of the gas bather film of each example at a halftone dot density of 5% to 50% (in 5% increments) using a gravure printing machine. The ink viscosity was 14 seconds (Zahn cup #3, 25° C.). The printing speed was 150 m/min and the drying temperature was 50° C. The surface after printing was observed with an optical microscope, and the dot missing portion was counted. The judgment was ○ if there were less than 5 dot missing portions in the 6 mm square area, Δ if there were 5 to 20 dot missing portions, and x if there were 21 or more dot missing portions. The determination results are shown in Table 2.

Note that "dot missing" refers to a state in which the ink is poorly deposited on the film base material and the dots (halftone dots) are not partially transferred. The smaller the number of the dot missing portion until a state where the halftone dot density is low, the better the printability at the highlighted portion.

<Evaluation of Oxygen Barrier Property, and Water Vapor Barrier Property after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive and a polypropylene film Trefan ZK93KM (60 μm) manufactured by Toray Advanced Film Co., Ltd. as the CPP, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side.

An A5 size 4-way seal pouch was made from the obtained gas barrier laminated film, filled with 150 ml of tap water as the content, and heat sterilized (retort treatment) for 30 minutes in hot water at 120° C.

For the gas barrier laminated films after the retort treatment, the oxygen permeability $cm^3/(m^2 \cdot day \cdot atm)$ was measured in an atmosphere of 30° C. and 70% RH using an oxygen permeability measuring device (trade name: OXTRAN-2/20, manufactured by MOCON, Inc.). Further, the water vapor permeability $(g/(m^2 \, day))$ was measured in an atmosphere of 40° C. and 90% RH using a water vapor permeability measuring device (trade name: PERMATRAN-W-3/33, manufactured by MOCON, Inc.). The measurement results are shown in Table 2.

TABLE 2

| | resin base material | | | | gas barrier property | | | | | | | | | |
|---|---|---|---|---|---|---|---|---|---|---|---|---|---|---|
| | type | black area ratio [%] | base layer | inorganic oxide layer | oxygen barrier coating | oxygen permeability $[cm^3/(m^2 \cdot day \, atm)]$ | water vapor permeability $[g/(m^2 \cdot day)]$ | printability halftone dot concentration (%) | | | | | | |
| | | | | | | | | 15 | 20 | 25 | 30 | 35 | 40 | 45 | 50 |
| Examples 2-1 | α2 | 0.04 | present | silicon oxide | organic-inorganic composite coating | 1.1 | 0.6 | x | x | Δ | ○ | ○ | ○ | ○ | ○ |
| Examples 2-2 | α3 | 0.00 | present | silicon oxide | organic-inorganic composite coating | 1.4 | 0.4 | x | x | Δ | ○ | ○ | ○ | ○ | ○ |
| Examples 2-3 | α8 | 0.11 | present | silicon oxide | organic-inorganic composite coating | 1.5 | 0.5 | x | x | Δ | ○ | ○ | ○ | ○ | ○ |
| Examples 2-4 | α10 | 0.03 | present | silicon oxide | organic-inorganic composite coating | 1.3 | 0.5 | x | x | Δ | ○ | ○ | ○ | ○ | ○ |
| Examples 2-5 | α11 | 0.06 | present | silicon oxide | organic-inorganic composite coating | 0.3 | 1.2 | Δ | Δ | ○ | ○ | ○ | ○ | ○ | ○ |
| Examples 2-6 | α12 | 0.11 | present | silicon oxide | organic-inorganic composite coating | 0.4 | 1.2 | Δ | Δ | ○ | ○ | ○ | ○ | ○ | ○ |
| Examples 2-7 | α8 | 0.11 | none | silicon oxide | organic-inorganic composite coating | 3.0 | 1.0 | x | x | Δ | ○ | ○ | ○ | ○ | ○ |
| Comparative Example 2-1 | α5 | 0.17 | present | silicon oxide | organic-inorganic composite coating | 6.0 | 1.5 | x | x | x | x | Δ | ○ | ○ | ○ |
| Comparative Example 2-2 | α9 | 0.38 | present | silicon oxide | organic-inorganic composite coating | 7.2 | 1.5 | x | x | x | x | Δ | ○ | ○ | ○ |
| Comparative Example 2-3 | α6 | 0.84 | present | silicon oxide | organic-inorganic composite coating | 8.6 | 1.5 | x | x | x | x | Δ | Δ | ○ | ○ |
| Comparative Example 2-4 | α7 | 0.39 | present | silicon oxide | organic-inorganic composite coating | 11.0 | 1.4 | x | x | x | x | Δ | Δ | ○ | ○ |

According to the results described in Table 2, the gas barrier films of Examples 2-1 to 2-7 had a black area ratio of 0.15% or less and a value of the oxygen permeability in an atmosphere of 30° C. and a relative humidity of 70% of 3 cm$^3$/(m$^2$·day·atm) or less, thus, a good oxygen barrier property was obtained.

On the other hand, the gas bather films of Comparative Examples 2-1 to 2-4 had a black area ratio of 0.15% or more and a value of the oxygen permeability of more than 5 cm$^3$/(m$^2$·day·atm), thus, since the black area ratio was higher over 0.15%, the oxygen permeability increased, and a better oxygen barrier property could not be obtained as compared with Examples 2-1 to 2-7.

According to the results described in Table 2, the gas barrier films of Examples 2-1 to 2-7 had a printability of "○" with a halftone dot density of 30% or more.

On the other hand, the gas bather films of Comparative Examples 2-1 to 2-4 had a printability of "x" with a halftone dot density of 30%.

As described above, it was found that the printability was good when the black area ratio was 0.15% or less.

Examples 3-1 to 3-7 and Comparative Example 3-1

The mixed solution for forming a base layer prepared in Production Example 1 was applied onto the corona-treated surface of the resin base material described in Table 3 using a gravure printing machine to form a coating film, which was then dried by passing through an oven at 100° C. for 10 seconds, to form a base layer having a thickness of 0.1 µm. Next, using a vacuum vapor deposition apparatus according to an electron beam heating mode, a mixed material containing two or more of metallic silicon, silicon monoxide, and silicon dioxide was evaporated, and an inorganic oxide layer made of silicon oxide having a thickness of 30 nm was formed. Subsequently, a coating agent containing the polycarboxylic acid-based polymer prepared in Production Example 2 as the main component was applied onto the formed inorganic oxide layer using a gravure printing machine to form a coating film, which was then dried by passing through an oven at 100° C. for 10 seconds to form a polycarboxylic acid-based polymer coating having a thickness of 0.2 µm, and further, a coating agent containing the polyvalent metal compound prepared in Production Example 3 as the main component was applied onto the polycarboxylic acid-based polymer coating using a gravure printing machine to form a coating film, which was then dried by passing through an oven at 100° C. for 10 seconds to form a polyvalent metal compound coating having a thickness of 0.2 µm, thereby forming an oxygen barrier coating composed of the polycarboxylic acid polyvalent metal salt coating, thus, gas barrier films of Examples 3-1 to 3-7 and Comparative Example 3-1 were obtained.

Example 3-8

The gas barrier film of Example 3-8 was obtained in the same manner as in Example 3-4 except that the inorganic oxide layer was directly formed on the corona-treated surface of the resin base material α8 without providing the base layer.

<Evaluation of Printability>

Using a gravure printing machine, a black ink (trade name: N920LPGT, manufactured by Toyo Ink Co., Ltd.) was gradation-printed on the oxygen barrier coating of the gas barrier film of each example at a halftone dot density of 5% to 50% (in 5% increments). The ink viscosity was 14 seconds (Zahn cup #3, 25° C.). The printing speed was 150 m/min, and the drying temperature was 50° C. The surface after printing was observed with an optical microscope, and the dot missing portion was counted. The judgment was ○ if there were less than 5 dot missing portions in the 6 mm square area, Δ if there were 5 to 20 dot missing portions, and × if there were 21 or more dot missing portions. The determination results are shown in Table 3.

Note that "dot missing" refers to a state in which the ink is poorly deposited on the film base material and the dots (halftone dots) are not partially transferred. The smaller the number of the dot missing portion until a state where the halftone dot density is low, the better the printability of the highlighted portion.

<Evaluation of Oxygen Barrier Property, and Water Vapor Barrier Property after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive and a polypropylene film Trefan ZK93KM (60 µm) manufactured by Toray Advanced Film Co., Ltd. as the CPP, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side.

An A5 size 4-way seal pouch was made from the obtained gas barrier laminated film, filled with 150 ml of tap water as the content, and heat sterilized (retort treatment) for 30 minutes in hot water at 120° C.

In the gas barrier laminated films after the retort treatment, the oxygen permeability cm$^3$/(m$^2$·day·atm) was measured in an atmosphere of 30° C. and 70% RH using an oxygen permeability measuring device (trade name: OXTRAN-2/20, manufactured by MOCON, Inc.). Further, the water vapor permeability (g/(m$^2$ day)) was measured in an atmosphere of 40° C. and 90% RH using a water vapor permeability measuring device (trade name: PERMATRAN-W-3/33, manufactured by MOCON, Inc.). The measurement results are shown in Table 3.

TABLE 3

| | resin base material | | | | | gas barrier property | | printability halftone dot concentration (%) | | | | | | | |
|---|---|---|---|---|---|---|---|---|---|---|---|---|---|---|---|
| | type | black area ratio [%] | base layer | inorganic oxide layer | oxygen barrier coating | oxygen permeability [cm³/(m²·day atm)] | water vapor permeability [g/(m²·day)] | 15 | 20 | 25 | 30 | 35 | 40 | 45 | 50 |
| Examples 3-1 | α2 | 0.04 | present | silicon oxide | polycarboxylic acid polyvalent metal salt coating | 0.9 | 0.7 | x | x | Δ | ○ | ○ | ○ | ○ | ○ |
| Examples 3-2 | α3 | 0.00 | present | silicon oxide | polycarboxylic acid polyvalent metal salt coating | 1.4 | 0.8 | x | x | Δ | ○ | ○ | ○ | ○ | ○ |
| Examples 3-3 | α4 | 0.00 | present | silicon oxide | polycarboxylic acid polyvalent metal salt coating | 0.3 | 0.4 | x | x | Δ | ○ | ○ | ○ | ○ | ○ |
| Examples 3-4 | α8 | 0.11 | present | silicon oxide | polycarboxylic acid polyvalent metal salt coating | 1.4 | 0.6 | x | x | Δ | ○ | ○ | ○ | ○ | ○ |
| Examples 3-5 | α10 | 0.03 | present | silicon oxide | polycarboxylic acid polyvalent metal salt coating | 1.0 | 0.6 | x | x | Δ | ○ | ○ | ○ | ○ | ○ |
| Examples 3-6 | α11 | 0.06 | present | silicon oxide | polycarboxylic acid polyvalent metal salt coating | 0.1 | 0.6 | Δ | Δ | ○ | ○ | ○ | ○ | ○ | ○ |
| Examples 3-7 | α12 | 0.11 | present | silicon oxide | polycarboxylic acid polyvalent metal salt coating | 0.2 | 0.7 | Δ | Δ | ○ | ○ | ○ | ○ | ○ | ○ |
| Examples 3-8 | α8 | 0.11 | none | silicon oxide | polycarboxylic acid polyvalent metal salt coating | 1.4 | 0.7 | x | x | Δ | ○ | ○ | ○ | ○ | ○ |
| Comparative Example 3-1 | α5 | 0.17 | present | silicon oxide | polycarboxylic acid polyvalent metal salt coating | 4.7 | 1.9 | x | x | x | x | Δ | ○ | ○ | ○ |

According to the results described in Table 3, the gas barrier films of Examples 3-1 to 3-8 had a black area ratio of 0.15% or less and a value of the oxygen permeability in an atmosphere of 30° C. and a relative humidity of 70% of 2 cm³/(m²·day·atm) or less, thus, could obtain a good oxygen barrier property.

On the other hand, the gas bather film of Comparative Example 3-1 had a black area ratio of 0.15% or more and a value of the oxygen permeability of 4.7 cm³/(m²·day·atm), thus, could not obtain a good oxygen barrier property as compared with Examples 3-1 to 3-8.

According to the results described in Table 3, the gas barrier films of Examples 3-1 to 3-8 had a halftone dot density of 30% or more and a printability of "○".

On the other hand, the gas bather film of Comparative Example 3-1 had a printability of "x" with a halftone dot density of 30%.

As described above, it was found that the printability is good when the black area ratio is 0.15% or less.

Examples 4-1 to 4-5 and Comparative Example 4-1

The mixed solution for forming a base layer prepared in Production Example 1 was applied onto the corona-treated surface of the resin base material described in Table 4 using a gravure printing machine, to form a coating film, which was then dried by passing through an oven at 100° C. for 10 seconds, to form a base layer having a thickness of 0.1 μm. Next, using a vacuum vapor deposition apparatus according to an electron beam heating mode, metallic aluminum was evaporated, and an oxygen gas was introduced therein, to form an inorganic oxide layer made of aluminum oxide having a thickness of 20 nm on the base layer. Subsequently, a coating agent containing the polycarboxylic acid-based polymer prepared in Production Example 2 as the main component was applied onto the formed inorganic oxide layer using a gravure printing machine to form a coating film, which was then dried by passing through an oven at 100° C. for 10 seconds to form a polycarboxylic acid-based polymer coating having a thickness of 0.2 μm, and further, a coating agent containing the polyvalent metal compound prepared in Production Example 3 as the main component was applied onto the polycarboxylic acid-based polymer coating using a gravure printing machine to form a coating film, which was then dried by passing through an oven at 100° C. for 10 seconds to form a polyvalent metal compound coating having a thickness of 0.2 μm, thereby forming an oxygen barrier coating composed of the polycarboxylic acid polyvalent metal salt coating, thus, gas barrier films of Examples 4-1 to 4-5 and Comparative Example 4-1 were obtained.

Example 4-6

A gas barrier film of Example 4-6 was obtained in the same manner as in Example 4-2 except that the inorganic oxide layer was directly formed on the corona-treated surface of the resin base material α8 without providing the base layer.

<Evaluation of Printability>

Using a gravure printing machine, a black ink (trade name: N920LPGT, manufactured by Toyo Ink Co., Ltd.) was gradation-printed on the oxygen barrier coating of the gas barrier film of each example at a halftone dot density of 5% to 50% (in 5% increments). The ink viscosity was 14 seconds (Zahn cup #3, 25° C.). The printing speed was 150 m/min and the drying temperature was 50° C. The surface after printing was observed with an optical microscope, and the dot missing portion was counted. The judgment was ○ if there were less than 5 dot missing portions in the 6 mm square area, Δ if there were 5 to 20 dot missing portions, and × if there were 21 or more dot missing portions. The determination results are shown in Table 4.

Note that "dot missing" refers to a state in which the ink is poorly deposited on the film base material and the dots (halftone dots) are not partially transferred. The smaller the number of the dot missing portion until a state where the halftone dot density is low, the better the printability of the highlighted portion.

<Evaluation of Oxygen Barrier Property, and Water Vapor Barrier Property after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive and a polypropylene film Trefan ZK93KM (60 μm) manufactured by Toray Advanced Film Co., Ltd. as the CPP, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side.

An A5 size 4-way seal pouch was made from the obtained gas barrier laminated film, filled with 150 ml of tap water as the content, and heat sterilized (retort treatment) for 30 minutes in hot water at 120° C.

In the gas barrier laminated films after the retort treatment, the oxygen permeability $cm^3/(m^2 \cdot day \cdot atm)$ was measured in an atmosphere of 30° C. and 70% RH using an oxygen permeability measuring device (trade name: OXTRAN-2/20, manufactured by MOCON, Inc.). Further, the water vapor permeability $(g/(m^2 \cdot day))$ was measured in an atmosphere of 40° C. and 90% RH using a water vapor permeability measuring device (trade name: PERMATRAN-W-3/33, manufactured by MOCON, Inc.). The measurement results are shown in Table 4.

TABLE 4

| | resin base material | | | | gas barrier property | | printability halftone dot concentration (%) | | | | | | | |
|---|---|---|---|---|---|---|---|---|---|---|---|---|---|---|
| | type | black area ratio [%] | base layer | inorganic oxide layer | oxygen barrier coating | oxygen permeability $[cm^3/(m^2 \cdot day\ atm)]$ | water vapor permeability $[g/(m^2 \cdot day)]$ | 15 | 20 | 25 | 30 | 35 | 40 | 45 | 50 |
| Examples 4-1 | α1 | 0.04 | present | aluminum oxide | polycarboxylic acid polyvalent metal salt coating | 0.3 | 1.5 | x | x | Δ | ○ | ○ | ○ | ○ | ○ |
| Examples 4-2 | α8 | 0.11 | present | aluminum oxide | polycarboxylic acid polyvalent metal salt coating | 0.2 | 0.9 | x | x | Δ | ○ | ○ | ○ | ○ | ○ |
| Examples 4-3 | α10 | 0.03 | present | aluminum oxide | polycarboxylic acid polyvalent metal salt coating | 0.2 | 1.5 | x | x | Δ | ○ | ○ | ○ | ○ | ○ |
| Examples 4-4 | α11 | 0.06 | present | aluminum oxide | polycarboxylic acid polyvalent metal salt coating | 0.1 | 1.5 | Δ | Δ | ○ | ○ | ○ | ○ | ○ | ○ |
| Examples 4-5 | α12 | 0.11 | present | aluminum oxide | polycarboxylic acid polyvalent metal salt coating | 0.1 | 1.7 | Δ | Δ | ○ | ○ | ○ | ○ | ○ | ○ |
| Examples 4-6 | α8 | 0.11 | none | aluminum oxide | polycarboxylic acid polyvalent metal salt coating | 0.4 | 2.8 | x | x | Δ | ○ | ○ | ○ | ○ | ○ |
| Comparative Example 4-1 | α5 | 0.17 | present | aluminum oxide | polycarboxylic acid polyvalent metal salt coating | 1.5 | 1.3 | x | x | x | x | Δ | ○ | ○ | ○ |

According to the results described in Table 4, the gas barrier films of Examples 4-1 to 4-6 had a black area ratio of 0.15% or less, and obtained a good oxygen barrier property with a value of the oxygen permeability in an atmosphere of 30° C. and a relative humidity of 70% of 1 $cm^3/(m^2 \cdot day \cdot atm)$ or less. On the other hand, the gas barrier film of Comparative Example 4-1 had a black area ratio of 0.15% or more, and obtained no good oxygen barrier property with a value of the oxygen permeability of 1.5 $cm^3/(m^2 \cdot day \cdot atm)$ as compared with Examples 4-1 to 4-6.

According to the results described in Table 4, the gas barrier films of Examples 4-1 to 4-6 had a printability of "○" with a halftone dot density of 30% or more.

On the other hand, the gas barrier film of Comparative Example 4-1 had a printability of "x" with a halftone dot density of 30%.

As described above, it was found that the printability is good when the black area ratio is 0.15% or less.

Examples 5-1 to 5-5 and Comparative Examples 5-1 to 5-3

The mixed solution for forming a base layer prepared in Production Example 1 was applied onto the corona-treated surface of the resin base material described in Table 5 using a gravure printing machine to form a coating film, which was then dried by passing through an oven at 60° C. for 10 second, to form a base layer having a thickness of 0.1 μm. Next, using a vacuum vapor deposition apparatus according to an electron beam heating mode, a mixed material containing two or more of metallic silicon, silicon monoxide, and silicon dioxide was evaporated, and an inorganic oxide layer made of silicon oxide having a thickness of 30 nm was formed on the base layer. Subsequently, a coating agent for forming the organic-inorganic composite coating prepared in Production Example 4 was applied onto the formed inorganic oxide layer using a gravure printing machine to form a coating film, which was then dried by passing through an oven at 60° C. for 10 seconds, to form an oxygen barrier coating composed of an organic-inorganic composite coating having a thickness of 0.3 μm, thus, gas bather films of Examples 5-1 to 5-5 and Comparative Examples 5-1 to 5-3 were obtained.

Example 5-6

A gas barrier film of Example 5-6 was obtained in the same manner as in Example 5-2 except that the inorganic oxide layer was formed directly, without providing the base layer, on the corona-treated surface of the resin base material α14.

Examples 5-7 to 5-11 and Comparative Examples 5-4 to 5-6

The mixed solution for forming a base layer prepared in Production Example 1 was applied onto the corona-treated surface of the resin base material described in Table 5 using a gravure printing machine to form a coating film, which was then dried by passing through an overn at 60° C. for 10 seconds to form a base layer having a thickness of 0.1 μm. Next, using a vacuum vapor deposition apparatus according to an electron beam heating mode, metallic aluminum was evaporated, and an oxygen gas was introduced therein, to form an inorganic oxide layer made of aluminum oxide having a thickness of 20 nm on the base layer. Subsequently, a coating agent containing the polycarboxylic acid-based polymer prepared in Production Example 2 as the main component was applied onto the formed inorganic oxide layer using a gravure printing machine to form a coating film, which was then dried by passing through an overn at 60° C. for 10 seconds to form a polycarboxylic acid-based polymer coating having a thickness of 0.2 μm, and further, a coating agent containing the polyvalent metal compound prepared in Production Example 3 as the main component was applied on the polycarboxylic acid-based polymer coating using a gravure printing machine to form a coating film, which was then dried by passing through an oven at 50° C. for 10 seconds to form a polyvalent metal compound coating having a thickness of 0.2 μm, thereby forming an oxygen barrier coating composed of the polycarboxylic acid polyvalent metal salt coating, thus, gas barrier films of Examples 5-7 to 5-11 and Comparative Examples 5-4 to 5-6 were obtained.

Example 5-12

A gas barrier film of Example 5-12 was obtained in the same manner as in Example 5-8 except that an inorganic oxide layer was formed directly, without providing the base layer, on the corona-treated surface of the resin base material α14.

Example 5-13

A gas barrier film of Example 5-13 was obtained in the same manner as in Example 5-8, except that a polyvalent metal compound coating was formed, without providing an inorganic oxide layer, on the base layer formed on the corona-treated surface of the resin base material α14.

<Evaluation of Oxygen Barrier Property and Water Vapor Barrier Property Before and After Boiling>

The gas barrier film of each example was bonded to LLDPE (polyethylene film) using an adhesive to prepare a gas barrier laminated film for boil treatment having a gas barrier film/adhesive/LLDPE configuration. Using a two-component curable adhesive Takelac A620 (main agent)/Takenate A65 (curing agent) manufactured by Mitsui Chemicals & SKC Polyurethanes Inc. as the adhesive and a polyethylene film TUX MC-S (60 μm) manufactured by Mitsui Chemicals Tohcello, Inc. as LLDPE, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side.

An A5 size 4-way seal pouch was made from the obtained gas barrier laminated film, filled with 150 ml of tap water as the content, and heat sterilized (boiled) for 30 minutes in hot water at 90° C.

In the gas barrier laminated films before and after the boiling treatment, the oxygen permeability cm³/(m²·day·atm) was measured in an atmosphere of 30° C. and 70% RH using an oxygen permeability measuring device (trade name: OXTRAN-2/20, manufactured by MOCON, Inc.). Further, the water vapor permeability (g/(m² day)) was measured in an atmosphere of 40° C. and 90% RH using a water vapor permeability measuring device (trade name: PERMATRAN-W-3/33, manufactured by MOCON, Inc.). The measurement results are shown in Table 5.

TABLE 5

| | resin base material | | | | | gas barrier property | | | |
|---|---|---|---|---|---|---|---|---|---|
| | | | | | | oxygen permeability [cm³/(m²·day·atm)] | | water vapor permeability [g/(m²·day)] | |
| | type | black area ratio [%] | base layer | inorganic oxide layer | oxygen barrier coating | before boiling | after boiling | before boiling | after boiling |
| Examples 5-1 | α13 | 0.13 | present | silicon oxide | organic-inorganic composite coating | 1.6 | 2.0 | 0.6 | 1.0 |
| Examples 5-2 | α14 | 0.07 | present | silicon oxide | organic-inorganic composite coating | 0.8 | 1.2 | 0.7 | 0.9 |
| Examples 5-3 | α15 | 0.04 | present | silicon oxide | organic-inorganic composite coating | 0.8 | 1.4 | 0.7 | 1.1 |
| Examples 5-4 | α16 | 0.12 | present | silicon oxide | organic-inorganic composite coating | 1.1 | 1.8 | 0.8 | 1.3 |
| Examples 5-5 | α17 | 0.06 | present | silicon oxide | organic-inorganic composite coating | 1.0 | 2.1 | 0.5 | 0.9 |

TABLE 5-continued

| | resin base material | | | | gas barrier property | | | |
|---|---|---|---|---|---|---|---|---|
| | | | | | oxygen permeability [cm³/(m²·day·atm)] | | water vapor permeability [g/(m²·day)] | |
| | type | black area ratio [%] | base layer | inorganic oxide layer | oxygen barrier coating | before boiling | after boiling | before boiling | after boiling |
| Examples 5-6 | α14 | 0.07 | none | silicon oxide | organic-inorganic composite coating | 1.3 | 2.3 | 1.0 | 1.5 |
| Examples 5-7 | α13 | 0.13 | present | aluminum oxide | polycarboxylic acid polyvalent metal salt coating | 0.6 | 0.5 | 1.6 | 1.8 |
| Examples 5-8 | α14 | 0.07 | present | aluminum oxide | polycarboxylic acid polyvalent metal salt coating | 0.3 | 0.2 | 1.8 | 1.9 |
| Examples 5-9 | α15 | 0.04 | present | aluminum oxide | polycarboxylic acid polyvalent metal salt coating | 0.4 | 0.4 | 1.6 | 1.9 |
| Examples 5-10 | α16 | 0.12 | present | aluminum oxide | polycarboxylic acid polyvalent metal salt coating | 0.5 | 0.5 | 1.7 | 2.0 |
| Examples 5-11 | α17 | 0.06 | present | aluminum oxide | polycarboxylic acid polyvalent metal salt coating | 0.4 | 0.4 | 1.4 | 1.6 |
| Examples 5-12 | α14 | 0.07 | none | aluminum oxide | polycarboxylic acid polyvalent metal salt coating | 0.4 | 0.2 | 1.8 | 2.0 |
| Examples 5-13 | α14 | 0.07 | present | none | polycarboxylic acid polyvalent metal salt coating | 0.9 | 0.6 | 2.0 | 2.1 |
| Comparative Example 5-1 | α18 | 0.32 | present | silicon oxide | organic-inorganic composite coating | 2.0 | 3.8 | 1.2 | 1.9 |
| Comparative Example 5-2 | α19 | 0.76 | present | silicon oxide | organic-inorganic composite coating | 2.5 | 4.5 | 1.3 | 2.0 |
| Comparative Example 5-3 | α20 | 0.85 | present | silicon oxide | organic-inorganic composite coating | 3.7 | 10.6 | 1.5 | 2.2 |
| Comparative Example 5-4 | α18 | 0.32 | present | aluminum oxide | polycarboxylic acid polyvalent metal salt coating | 1.0 | 1.2 | 1.6 | 2.2 |
| Comparative Example 5-5 | α19 | 0.76 | present | aluminum oxide | polycarboxylic acid polyvalent metal salt coating | 1.4 | 1.5 | 1.8 | 2.2 |
| Comparative Example 5-6 | α20 | 0.85 | present | aluminum oxide | polycarboxylic acid polyvalent metal salt coating | 1.8 | 2.5 | 1.9 | 2.3 |

According to the results described in Table 5, in the gas barrier films of Examples 5-1 to 5-6, the black area ratio was 0.15% or less, and the value of oxygen permeability in an atmosphere of 30° C. and a relative humidity of 70% was 2 cm³/(m²·day·atm) or less before boiling and 3 cm³/(m²·day·atm) or less after boiling, namely, a good oxygen barrier property was obtained.

In the gas barrier films of Examples 5-7 to 5-13, the black area ratio was 0.15% or less, and the value of the oxygen permeability in an atmosphere of 30° C. and a relative humidity of 70% was 1 cm³/(m²·day·atm) or less before and after boiling, namely, a good oxygen barrier property was obtained.

On the other hand, in the gas barrier films of Comparative Examples 5-1 to 5-3, the black area ratio was 0.15% or more, and the value of the oxygen permeability was 2 cm³/(m²·day·atm) or more before boiling and 3 cm³/(m²·day·atm) or more after boiling, namely, a good oxygen barrier property was not obtained.

In the gas barrier films of Comparative Examples 5-4 to 5-6, the black area ratio was 0.15% or more, and the value of the oxygen permeability was 1 cm³/(m²·day·atm) or more before and after boiling, namely, a good oxygen barrier property was not obtained.

Examples 6-1 to 6-4 and Comparative Examples 6-1 to 6-5

In Examples 6-1 to 6-4 and Comparative Examples 6-1 to 6-5, the influence by the production lot of the resin base material was examined.

The mixed solution for forming a base layer prepared in Production Example 1 was applied onto the corona-treated surface of the resin base material described in Table 6A using a gravure printing machine to form a coating film, which was then dried by passing through an oven at 100° C. for 10 seconds, to form a base layer having a thickness of 0.1 μm. Next, a coating agent containing the polycarboxylic acid-based polymer prepared in Production Example 2 as the main component was applied onto the formed base layer using a gravure printing machine to form a coating film, which was then dried by passing through an oven at 100° C. for 10 seconds to form a polycarboxylic acid-based polymer coating having a thickness of 0.2 μm, and further, a coating agent containing the polyvalent metal compound prepared in Production Example 3 as the main component was applied onto the polycarboxylic acid-based polymer coating using a gravure printing machine to form a coating film, which was then dried by passing through an oven at 100° C. for 10 seconds, to form a polyvalent metal compound coating having a thickness of 0.2 μm, thereby forming an oxygen barrier coating composed of the polycarboxylic acid polyvalent metal salt coating, thus, gas barrier films of Experimental Examples 6-1 to 6-4 and Comparative Examples 6-1 to 6-5 were obtained.

Examples 6-5 to 6-8 and Comparative Examples 6-6 to 6-10

The mixed solution for forming a base layer prepared in Production Example 1 was applied onto the corona-treated surface of the resin base material described in Table 6B using a gravure printing machine to form a coating film, which was then dried by passing through an oven at 100° C. for 10 seconds, to form a base layer having a thickness of 0.1

μm. Next, using a vacuum vapor deposition apparatus according to an electron beam heating mode, a mixed material containing two or more of metallic silicon, silicon monoxide, and silicon dioxide was evaporated, and an inorganic oxide layer made of silicon oxide having a thickness of 30 nm was formed on the base layer. Subsequently, a coating agent for forming an organic-inorganic composite coating prepared in Production Example 4 was applied onto the formed inorganic oxide layer using a gravure printing machine to form a coating film, which was then dried by passing through an oven at 100° C. for 10 seconds, to form an oxygen bather coating composed of an organic-inorganic composite coating having a thickness of 0.3 μm, thus, gas bather films of Examples 6-5 to 6-8 and Comparative Examples 6-6 to 6-10 were obtained.

The black area ratio, oxygen permeability and printability of the resin base material were evaluated by the same method as in Examples 1-1 to 1-8. The measurement results are shown in Table 6A and Table 6B.

TABLE 6A

| | type of resin base material | production lot | black area ratio | inorganic base layer | inorganic oxide layer | oxygen barrier coating | oxygen permeability [cm³/(m²·day·atm)] | printability halftone dot concentration (%) | | | | | | | |
|---|---|---|---|---|---|---|---|---|---|---|---|---|---|---|---|
| | | | | | | | | 15 | 20 | 25 | 30 | 35 | 40 | 45 | 50 |
| Examples 6-1 | α8 | A | 0.10 | present | none | polycarboxylic acid polyvalent metal salt coating | 1.3 | x | x | Δ | ○ | ○ | ○ | ○ | ○ |
| Examples 6-2 | α8 | B | 0.03 | present | none | polycarboxylic acid polyvalent metal salt coating | 1.0 | x | x | Δ | ○ | ○ | ○ | ○ | ○ |
| Examples 6-3 | α8 | C | 0.05 | present | none | polycarboxylic acid polyvalent metal salt coating | 1.1 | x | x | Δ | ○ | ○ | ○ | ○ | ○ |
| Examples 6-4 | α8 | D | 0.05 | present | none | polycarboxylic acid polyvalent metal salt coating | 1.2 | x | x | Δ | ○ | ○ | ○ | ○ | ○ |
| Comparative Example 6-1 | α8 | E | 0.16 | present | none | polycarboxylic acid polyvalent metal salt coating | 2.1 | x | x | x | Δ | ○ | ○ | ○ | ○ |
| Comparative Example 6-2 | α9 | F | 0.47 | present | none | polycarboxylic acid polyvalent metal salt coating | 2.9 | x | x | x | x | x | Δ | ○ | ○ |
| Comparative Example 6-3 | α9 | G | 0.66 | present | none | polycarboxylic acid polyvalent metal salt coating | 3.3 | x | x | x | x | x | Δ | ○ | ○ |
| Comparative Example 6-4 | α9 | H | 0.33 | present | none | polycarboxylic acid polyvalent metal salt coating | 2.6 | x | x | x | x | Δ | ○ | ○ | ○ |
| Comparative Example 6-5 | α9 | I | 0.39 | present | none | polycarboxylic acid polyvalent metal salt coating | 2.8 | x | x | x | x | Δ | ○ | ○ | ○ |

TABLE 6B

| | type of resin base material | production lot | black area ratio | inorganic base layer | inorganic oxide layer | oxygen barrier coating | oxygen permeability [cm³/(m²·day·atm)] | printability halftone dot concentration (%) | | | | | | | |
|---|---|---|---|---|---|---|---|---|---|---|---|---|---|---|---|
| | | | | | | | | 15 | 20 | 25 | 30 | 35 | 40 | 45 | 50 |
| Examples 6-5 | α8 | A | 0.10 | present | silicon oxide | organic-inorganic composite coating | 1.7 | x | x | Δ | ○ | ○ | ○ | ○ | ○ |
| Examples 6-6 | α8 | B | 0.03 | present | silicon oxide | organic-inorganic composite coating | 1.3 | x | x | Δ | ○ | ○ | ○ | ○ | ○ |
| Examples 6-7 | α8 | C | 0.05 | present | silicon oxide | organic-inorganic composite coating | 1.4 | x | x | Δ | ○ | ○ | ○ | ○ | ○ |
| Examples 6-8 | α8 | D | 0.05 | present | silicon oxide | organic-inorganic composite coating | 1.3 | x | x | Δ | ○ | ○ | ○ | ○ | ○ |
| Comparative Example 6-6 | α8 | E | 0.16 | present | silicon oxide | organic-inorganic composite coating | 2.8 | x | x | x | Δ | ○ | ○ | ○ | ○ |
| Comparative Example 6-7 | α9 | F | 0.47 | present | silicon oxide | organic-inorganic composite coating | 7.9 | x | x | x | x | x | Δ | ○ | ○ |
| Comparative Example 6-8 | α9 | G | 0.66 | present | silicon oxide | organic-inorganic composite coating | 9.6 | x | x | x | x | x | Δ | ○ | ○ |
| Comparative Example 6-9 | α9 | H | 0.33 | present | silicon oxide | organic-inorganic composite coating | 6.4 | x | x | x | x | Δ | ○ | ○ | ○ |
| Comparative Example 6-10 | α9 | I | 0.39 | present | silicon oxide | organic-inorganic composite coating | 7.1 | x | x | x | x | Δ | ○ | ○ | ○ |

First, the materials, product numbers, manufacturers, and thicknesses of the resin base materials used in Examples 6-1 to 6-4 and Comparative Example 6-1 are the same, but the production lots are different. Similarly, the materials, product numbers, manufacturers, and thicknesses of the resin base materials used in Examples 6-5 to 6-8 and Comparative Example 6-6 are the same, but the production lots are different. However, the black area ratio of the resin base material measured by the above method was different for each production lot. That is, it was confirmed from the measurement results of the black area ratio shown in Tables 6A and 6B that the black area ratio measured by the above method is not a value peculiar to the type of the resin base material ($α8$ or $α9$), but is a value varying depending on the production lot.

Next, according to the results shown in Tables 6A and 6B, the gas barrier films according to Examples 6-1 to 6-4 and Examples 6-5 to 6-8 (the black area ratio of the resin base material is 0.15% or less) showed a good oxygen barrier property in an atmosphere of 30° C. and a relative humidity of 70%, and the printability was evaluated as "0" at a halftone dot density of 30% or more. On the other hand, in the gas barrier film according to Comparative Example 6-1, the black area ratio of the resin base material exceeded 0.15%, and as compared with Examples 6-1 to 6-4 having the same configuration, the oxygen permeability was high and the printability deteriorated. Similarly, the gas barrier film according to Comparative Example 6-6 also had a black area ratio of the resin base material exceeding 0.15%, and as compared with Examples 6-5 to 6-8 having the same configuration, the oxygen permeability was high and the printability deteriorated.

From these results, it was confirmed that even when a gas barrier film having the same configuration is constructed using the same type of resin base material, the performance of the gas barrier film differs depending on the production lot of the resin base material, but when the black area ratio of the resin base material is 0.15% or less, the influence caused by the production lot of the resin base material can be reduced.

Hereinafter, Embodiment 2 of the present disclosure will be described in more detail with reference to Examples and Comparative Examples. However, the present disclosure is not limited to the following examples. The materials used in each of the following examples are shown below.

[Material Used]
<Resin Base Material>
- $β1$: Biaxially stretched polypropylene film (trade name: ME-1, thickness 20 μm, surface layer is made of polyolefin-based copolymer resin, manufactured by Mitsui Chemicals Tohcello, Inc.).
- $β2$: Biaxially stretched polypropylene film (trade name: P2111, thickness 20 μm, surface layer is made of polyolefin-based copolymer resin, manufactured by Toyobo Co., Ltd.).
- $β3$: Biaxially stretched polypropylene film (trade name: VPH2011, thickness 20 μm, surface layer is made of polyolefin-based copolymer resin, containing AB agent having an average particle size of 2 μm, manufactured by A.J. Plast).
- $β4$: Biaxially stretched polypropylene film (trade name: VPH2011, thickness 20 μm, surface layer is made of polyolefin-based copolymer resin, containing AB agent having an average particle size of 4 μm, manufactured by A.J. Plast).
- $β5$: Biaxially stretched polypropylene film (trade name: TS19TIMCP, thickness 19 μm, surface layer is made of polyolefin-based copolymer resin, manufactured by Max Speciality films Limited).
- $β6$: Biaxially stretched polypropylene film (trade name: TS18TIV, thickness 18 μm, surface layer is made of polyolefin-based copolymer resin, manufactured by Max Speciality films Limited).
- $β7$: Biaxially stretched polypropylene film (trade name: TS18TI-TPN, thickness 18 μm, surface layer is made of polypropylene homopolymer, manufactured by Max Speciality films Limited).
- $β8$: Biaxially stretched polypropylene film (trade name: M-1, thickness 20 μm, surface layer is made of polypropylene homopolymer, manufactured by Mitsui Chemicals Tohcello, Inc.).

[Measurement of Number of Protrusions on Surface of Resin Base Material]

With respect to the surface (first surface) of the resin base materials $β1$ to $β8$ on the side where the oxygen barrier coating is formed, the number of protrusions having a ferret diameter of 8 μm or more was determined according to the above-mentioned measurement conditions. The results are shown in Tables 7 to 10.

Examples 7-1 to 7-3 and Comparative Examples 7-1 to 7-5

The mixed solution for forming a base layer prepared in Production Example 1 was applied onto the first surface of the resin base material described in Table 7 using a gravure printing machine to form a coating film, which was then dried by passing through an oven at 100° C. for 10 seconds, to form a base layer having a thickness of 0.1 μm. Next, using a vacuum vapor deposition apparatus according to an electron beam heating method, a mixed material containing two or more of metallic silicon, silicon monoxide, and silicon dioxide was evaporated, and an inorganic oxide layer made of silicon oxide having a thickness of 30 nm was formed on the base layer. Subsequently, a coating agent for forming the organic-inorganic composite coating prepared in Production Example 4 was applied onto the formed inorganic oxide layer using a gravure printing machine to form a coating film, which was then dried by passing through an oven at 100° C. for 10 seconds, to form an oxygen barrier coating composed of an organic-inorganic composite coating having a thickness of 0.3 μm, thus, gas barrier films of Examples 7-1 to 7-3 and Comparative Examples 7-1 to 7-5 were obtained.

Example 7-4

A gas barrier film of Example 7-4 was obtained in the same manner as in Example 7-3 except that the inorganic oxide layer was directly formed on the first surface of the resin base material $β3$ without providing the base layer.

<Evaluation of Oxygen Barrier Property, Water Vapor Barrier Property, and Lamination Strength after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive and a polypropylene film Trefan ZK93KM (60 μm) manufactured by Toray Advanced film Co., Ltd. as the CPP, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side. An A5 size 4-way seal pouch was made from the obtained gas barrier laminated film, filled with 200 ml of tap water as the content, and heat sterilized (retort treatment) for 30 minutes in hot water at 120° C. For the gas barrier laminated film after the retort treatment, the oxygen permeability ($cm^3/(m^2 \cdot day \cdot atm)$) was measured in an atmosphere of 30° C. and 70% RH using an oxygen permeability measuring device (trade name: OXTRAN-2/20, manufactured by MOCON, Inc.). Further, using a water vapor permeability measuring device (trade name: PERMATRAN-W-3/33, manufactured by MOCON, Inc.), the water vapor permeability ($g/(m^2 \, day)$) was measured in an atmosphere of 40° C. and 90% RH. The measurement results are shown in Table 7. For the gas barrier laminated film after the retort treatment, a test piece was cut into strips with a width of 15 mm, and the lamination strength between the gas barrier film and the CPP film was measured by a universal tester Tensilon RTC-1250 with peeling under T-type and 180° at a peeling speed of 300 m/min. The measurement results are shown in Table 7.

According to the results described in Table 7, the gas barrier films of Examples 7-1 to 7-4 in which the first surface of the resin base material is made of a polyolefin-based copolymer resin and the first surface of the resin base material has not more than 20 pieces/$mm^2$ protrusions with a ferret diameter of 8 μm or more showed a good oxygen barrier property with a value of the oxygen permeability of 3 $cm^3/(m^2 \cdot day \cdot atm)$ or less in an atmosphere of 30° C. and 70% RH, and showed a good water vapor barrier property with a value of the water vapor permeability of 1 $g/(m^2 \, day)$ or less in an atmosphere of 40° C. and 90% RH. On the other hand, the gas barrier films of Comparative Examples 7-1 to 7-3 having over 20 pieces/$mm^2$ protrusions with a ferret diameter of 8 μm or more on the first surface of the resin base material had a value of the oxygen permeability of over 3 $cm^3/(m^2 \cdot day \cdot atm)$ and a value of the water vapor permeability of over 1 $g/(m^2 \, day)$, thus, the oxygen bather property and the water vapor barrier property were inferior.

According to the results described in Table 7, Comparative Examples 7-4 to 7-5 in which the first surface of the resin base material is made of a polypropylene homopolymer had no sufficient strength with a lamination strength

TABLE 7

| | | resin base material | | | | | | | lamination strength [N/15 mm] | |
|---|---|---|---|---|---|---|---|---|---|---|
| | | first surface | | | | | | | | |
| | type | resin | number of protrusion having a ferret diameter of 8 μm or more (pieces/$mm^2$) | base layer | inorganic oxide layer | oxygen barrier coating | oxygen permeability [$cm^3/(m^2 \cdot day \cdot atm)$] | water vapor permeability [$g/(m^2 \cdot day)$] | T type peeling | 180° peeling |
| Examples 7-1 | β1 | polyolefin-based copolymer resin | 6.2 | present | silicon oxide | organic-inorganic composite coating | 1.1 | 0.6 | base material cut | 3.5 |
| Examples 7-2 | β2 | polyolefin-based copolymer resin | 7.9 | present | silicon oxide | organic-inorganic composite coating | 0.9 | 0.4 | 3.5 | 3.3 |
| Examples 7-3 | β3 | polyolefin-based copolymer resin | 15.2 | present | silicon oxide | organic-inorganic composite coating | 1.4 | 0.5 | base material cut | 4.1 |
| Examples 7-4 | β3 | polyolefin-based copolymer resin | 15.2 | none | silicon oxide | organic-inorganic composite coating | 3.0 | 1.0 | base material cut | 3.5 |
| Comparative Example 7-1 | β4 | polyolefin-based copolymer resin | 28.7 | present | silicon oxide | organic-inorganic composite coating | 7.2 | 1.5 | 3.7 | 3.5 |
| Comparative Example 7-2 | β5 | polyolefin-based copolymer resin | 28.3 | present | silicon oxide | organic-inorganic composite coating | 3.5 | 1.3 | 2.5 | 4.7 |
| Comparative Example 7-3 | β6 | polyolefin-based copolymer resin | 32.3 | present | silicon oxide | organic-inorganic composite coating | 4.4 | 1.2 | 2.5 | 4.7 |
| Comparative Example 7-4 | β7 | polypropylene homopolymer | 1.0 | present | silicon oxide | organic-inorganic composite coating | 1.4 | 0.4 | 1.1 | 1.0 |
| Comparative Example 7-5 | β8 | polypropylene homopolymer | 11.1 | present | silicon oxide | organic-inorganic composite coating | 3.7 | 1.1 | 1.2 | 1.3 | after the retort treatment of less than 2 N/15 mm, while Examples 7-1 to 7-4 in which the first surface of the resin base material is made of a polyolefin-based copolymer resin had a sufficient lamination strength of 2 N/15 mm or more even after the retort treatment. In particular, Example 7-4 showed good lamination strength even without the base layer. Further, "base material cut" in Table 7 indicates that the resin base material was broken at a strength of 2 N/15 mm or more without peeling between the gas barrier film and the CPP film, indicating that the lamination strength was sufficiently high.

Examples 8-1 to 8-3 and Comparative Examples 8-1 to 8-3

The mixed solution for forming a base layer prepared in Production Example 1 was applied onto the first surface of the resin base material described in Table 8 using a gravure printing machine to form a coating film, which was then dried by passing through an oven at 100° C. for 10 seconds, to form a base layer having a thickness of 0.1 μm. Next, using a vacuum vapor deposition apparatus according to an electron beam heating mode, a mixed material containing two or more of metallic silicon, silicon monoxide, and silicon dioxide was evaporated, and an inorganic oxide layer made of silicon oxide having a thickness of 30 nm was formed on the base layer. Subsequently, a coating agent containing the polycarboxylic acid-based polymer prepared in Production Example 2 as the main component was applied onto the formed inorganic oxide layer using a gravure printing machine to form a coating film, which was then dried by passing through an oven at 100° C. for 10 seconds to form a polycarboxylic acid-based polymer coating having a thickness of 0.2 μm, and further, a coating agent containing the polyvalent metal compound prepared in Production Example 3 as the main component was applied onto the polycarboxylic acid-based polymer coating using a gravure printing machine to form a coating film, which was then dried by passing through an oven at 100° C. for 10 seconds to form a polyvalent metal compound coating having a thickness of 0.2 μm, thereby forming an oxygen barrier coating composed of a polycarboxylic acid polyvalent metal salt coating, thus, gas barrier films of Examples 8-1 to 8-3 and Comparative Examples 8-1 to 8-3 were obtained.

Example 8-4

A gas barrier film of Example 8-4 was obtained in the same manner as in Example 8-3 except that the inorganic oxide layer was directly formed on the first surface of the resin base material β3 without providing the base layer.

<Evaluation of Oxygen Barrier Property, Water Vapor Barrier Property, and Lamination Strength after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive and a polypropylene film Trefan ZK93KM (60 μm) manufactured by Toray Advanced film Co., Ltd. as the CPP, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side. An A5 size 4-way seal pouch was made from the obtained gas barrier laminated film, filled with 200 ml of tap water as the content, and heat sterilized (retort treatment) for 30 minutes in hot water at 120° C. For the gas barrier laminated film after the retort treatment, the oxygen permeability ($cm^3/(m^2 \cdot day \cdot atm)$) was measured in an atmosphere of 30° C. and 70% RH using an oxygen permeability measuring device (trade name: OXTRAN-2/20, manufactured by MOCON, Inc.). Further, using a water vapor permeability measuring device (trade name: PERMATRAN-W-3/33, manufactured by MOCON, Inc.), the water vapor permeability ($g/(m^2 \cdot day)$) was measured in an atmosphere of 40° C. and 90% RH. The measurement results are shown in Table 8. For the gas barrier laminated film after the retort treatment, a test piece was cut into strips with a width of 15 mm, and the lamination strength between the gas barrier film and the CPP film was measured by a universal tester Tensilon RTC-1250 with peeling under T-type and 180° at a peeling speed of 300 m/min. The measurement results are shown in Table 8.

TABLE 8

| | | resin base material | | | | | | | lamination strength [N/15 mm] | |
| --- | --- | --- | --- | --- | --- | --- | --- | --- | --- | --- |
| | | first surface | | | | | | | | |
| | type | resin | number of protrusion having a ferret diameter of 8 μm or more (pieces/mm$^2$) | base layer | inorganic oxide layer | oxygen barrier coating | oxygen permeability [$cm^3/(m^2 \cdot day \cdot atm)$] | water vapor permeability [$g/(m^2 \cdot day)$] | T type peeling | 180° peeling |
| Examples 8-1 | β1 | polyolefin-based copolymer resin | 6.2 | present | silicon oxide | polycarboxylic acid polyvalent metal salt coating | 0.9 | 0.7 | base material cut | 5.0 |
| Examples 8-2 | β2 | polyolefin-based copolymer resin | 7.9 | present | silicon oxide | polycarboxylic acid polyvalent metal salt coating | 0.3 | 0.4 | 3.0 | 5.3 |
| Examples 8-3 | β3 | polyolefin-based copolymer resin | 15.2 | present | silicon oxide | polycarboxylic acid polyvalent metal salt coating | 1.1 | 0.6 | 2.5 | 5.1 |

TABLE 8-continued

| | type | resin | number of protrusion having a ferret diameter of 8 μm or more (pieces/mm²) | base layer | inorganic oxide layer | oxygen barrier coating | oxygen permeability [cm³/(m²·day·atm)] | water vapor permeability [g/(m²·day)] | lamination strength [N/15 mm] T type peeling | lamination strength [N/15 mm] 180° peeling |
|---|---|---|---|---|---|---|---|---|---|---|
| Examples 8-4 | β3 | polyolefin-based copolymer resin | 15.2 | none | silicon oxide | polycarboxylic acid polyvalent metal salt coating | 1.4 | 0.7 | 2.2 | 5.0 |
| Comparative Example 8-1 | β4 | polyolefin-based copolymer resin | 28.7 | present | silicon oxide | polycarboxylic acid polyvalent metal salt coating | 3.1 | 0.8 | 2.4 | 5.0 |
| Comparative Example 8-2 | β7 | polypropylene homopolymer | 1.0 | present | silicon oxide | polycarboxylic acid polyvalent metal salt coating | 2.3 | 0.8 | 1.2 | 1.8 |
| Comparative Example 8-3 | β8 | polypropylene homopolymer | 11.1 | present | silicon oxide | polycarboxylic acid polyvalent metal salt coating | 3.7 | 1.8 | 1.1 | 1.6 |

According to the results described in Table 8, the gas barrier films of Examples 8-1 to 8-4 in which the first surface of the resin base material is made of a polyolefin-based copolymer resin and the density of protrusions with a ferret diameter of 8 μm or more on the first surface of the resin base material is 20 pieces/mm² or less showed a good oxygen barrier property with a value of the oxygen permeability of 2 cm³/(m²·day·atm) or less in an atmosphere of 30° C. and 70% RH. On the other hand, the gas barrier films of Comparative Examples 8-1 to 8-3 in which the density of protrusions with a ferret diameter of 8 μm or more on the first surface of the resin base material is over 20 pieces/mm² or the first surface of the resin base material is made of a polypropylene homopolymer were inferior in the oxygen barrier property with a value of the oxygen permeability of over 2 cm³/(m²·day·atm).

According to the results described in Table 8, Comparative Examples 8-2 to 8-3 in which the first surface of the resin base material is made of a polypropylene homopolymer had no sufficient strength with a lamination strength after the retort treatment of less than 2 N/15 mm, while Examples 8-1 to 8-4 in which the first surface of the resin base material is made of a polyolefin-based copolymer resin had a sufficient lamination strength of 2 N/15 mm or more even after the retort treatment. In particular, Example 8-4 showed good lamination strength even without the base layer.

Examples 9-1 to 9-3 and Comparative Examples 9-1 to 9-3

The mixed solution for forming a base layer prepared in Production Example 1 was applied onto the first surface of the resin base material described in Table 9 using a gravure printing machine to form a coating film, which was then dried by passing through an oven at 100° C. for 10 seconds, to form a base layer having a thickness of 0.1 μm. Next, a coating agent containing the polycarboxylic acid-based polymer prepared in Production Example 2 as the main component was applied onto the formed base layer using a gravure printing machine to form a coating film, which was then dried by passing through an oven at 100° C. for 10 seconds, to form a polycarboxylic acid-based polymer coating having a thickness of 0.2 μm, and further, a coating agent containing the polyvalent metal compound prepared in Production Example 3 as the main component was applied onto the polycarboxylic acid-based polymer coating using a gravure printing machine to form a coating film, which was then dried by passing through an oven at 100° C. for 10 seconds to form a polyvalent metal compound coating having a thickness of 0.2 μm, thereby forming an oxygen barrier coating composed of the polycarboxylic acid polyvalent metal salt coating, thus, gas barrier films of Examples 9-1 to 9-3 and Comparative Examples 9-1 to 9-3 were obtained.

<Evaluation of Oxygen Barrier Property, Water Vapor Barrier Property, and Lamination Strength after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive, and a polypropylene film Trefan ZK93KM (60 μm) manufactured by Toray Advanced film Co., Ltd. as the CPP, these were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side. An A5 size 4-way seal pouch was made from the obtained gas barrier laminated film, filled with 200 ml of tap water as the content, and heat sterilized (retort treatment) for 30 minutes in hot water at 120° C. For the gas barrier laminated film after the retort treatment, the oxygen permeability (cm³/(m²·day·atm)) was measured in an atmosphere of 30° C. and 70% RH using an oxygen permeability measuring device (trade name: OXTRAN-2/20, manufactured by MOCON, Inc.). Further, using a water vapor permeability measuring device (trade name: PERMATRAN-W-3/33, manufactured by MOCON, Inc.), the water vapor permeability (g/(m² day)) was measured in an atmosphere of 40° C. and 90% RH. The measurement results are shown in Table 9. For the gas barrier laminated film after the retort treatment, a test piece was cut into strips with a width of 15 mm, and the lamination strength between the gas barrier film and the CPP film was measured by a universal tester Tensilon RTC-1250 with peeling under T-type and 180° at a peeling speed of 300 m/min. The measurement results are shown in Table 9.

Example 10-1 and Comparative Example 10-1

The mixed solution for forming a base layer prepared in Production Example 1 was applied onto the first surface of the resin base material described in Table 10 using a gravure printing machine to form a coating film, which was then dried by passing through an oven at 100° C. for 10 seconds, to form a base layer having a thickness of 0.1 μm. Next, using a vacuum vapor deposition apparatus according to an electron beam heating mode, metallic aluminum was evaporated, and an oxygen gas was introduced therein, to form an inorganic oxide layer made of aluminum oxide having a thickness of 20 nm on the base layer. Subsequently, a coating agent containing the polycarboxylic acid-based polymer

TABLE 9

| | | resin base material | | | | | | | lamination strength [N/15 mm] | |
| --- | --- | --- | --- | --- | --- | --- | --- | --- | --- | --- |
| | | first surface | | | | | | | | |
| | type | resin | number of protrusion having a ferret diameter of 8 μm or more (pieces/mm²) | base layer | inorganic oxide layer | oxygen barrier coating | oxygen permeability [cm³/(m² · day · atm)] | water vapor permeability [g/(m² · day)] | T type peeling | 180° peeling |
| Examples 9-1 | β1 | polyolefin-based copolymer resin | 6.2 | present | none | polycarboxylic acid polyvalent metal salt coating | 0.4 | 2.9 | 2.8 | 4.8 |
| Examples 9-2 | β2 | polyolefin-based copolymer resin | 7.9 | present | none | polycarboxylic acid polyvalent metal salt coating | 1.2 | 2.7 | 3.2 | 5.2 |
| Examples 9-3 | β3 | polyolefin-based copolymer resin | 15.2 | present | none | polycarboxylic acid polyvalent metal salt coating | 1.0 | 3.0 | 2.4 | 5.0 |
| Comparative Example 9-1 | β4 | polyolefin-based copolymer resin | 28.7 | present | none | polycarboxylic acid polyvalent metal salt coating | 2.6 | 3.0 | 2.5 | 5.0 |
| Comparative Example 9-2 | β5 | polyolefin-based copolymer resin | 28.3 | present | none | polycarboxylic acid polyvalent metal salt coating | 3.2 | 3.0 | 2.4 | 4.5 |
| Comparative Example 9-3 | β6 | polyolefin-based copolymer resin | 32.3 | present | none | polycarboxylic acid polyvalent metal salt coating | 4.0 | 3.1 | 2.5 | 4.7 |

According to the results described in Table 9, the gas barrier films of Examples 9-1 to 9-3 in which the first surface of the resin base material is made a polyolefin-based copolymer resin and the density of protrusions with a ferret diameter of 8 μm or more on the first surface of the resin base material is 20 pieces/mm² or less showed a good oxygen barrier property with a value of the oxygen permeability of 2 cm³/(m²·day·atm) or less in an atmosphere of 30° C. and 70% RH, and the lamination strength after the retort treatment also had a sufficient lamination strength of 2 N/15 mm or more. On the other hand, the gas barrier films of Comparative Examples 9-1 to 9-3 in which the density of protrusions with a ferret diameter of 8 μm or more on the first surface of the resin base material is over 20 pieces/mm² were inferior in the oxygen barrier property with a value of the oxygen permeability of over 2 cm³/(m²·day·atm).

prepared in Production Example 2 as the main component was applied onto the formed inorganic oxide layer using a gravure printing machine to form a coating film, which was then dried by passing through an oven at 100° C. for 10 seconds, to form a polycarboxylic acid-based polymer coating having a thickness of 0.2 μm, and further, a coating agent containing the polyvalent metal compound prepared in Production Example 3 as the main component was applied onto the polycarboxylic acid-based polymer coating using a gravure printing machine to form a coating film, which was then dried by passing through an oven at 100° C. for 10 seconds, to form a polyvalent metal compound coating having a thickness of 0.2 μm, thereby forming an oxygen barrier coating composed of the polycarboxylic acid polyvalent metal salt coating, thus, gas barrier films of Example 10-1 and Comparative Example 10-1 were obtained.
<Evaluation of Oxygen Barrier Property, Water Vapor Barrier Property, and Lamination Strength after Retort Treatment>

The gas barrier film of each example was bonded to CPP (polypropylene film) using an adhesive to prepare a gas barrier laminated film for retort treatment having a gas barrier film/adhesive/CPP configuration. Using a two-component curable adhesive Takelac A620 (main agent)/Takenate A65 (curing agent) manufactured by Mitsui Chemicals & SKC Polyurethanes Inc. as the adhesive and a polypropylene film Trefan ZK93KM (60 μm) manufactured by Toray Advanced film Co., Ltd. as the CPP, the films were dry-laminated by a multi-coater TM-MC manufactured by HIRANO TECSEED Co., Ltd. and cured at 40° C. for 3 days. The oxygen barrier coating of the gas barrier film was arranged so as to be on the adhesive side. An A5 size 4-way seal pouch was made from the obtained gas barrier laminated film, filled with 200 ml of tap water as the content, and heat sterilized (retort treatment) for 30 minutes in hot water at 120° C. For the gas barrier laminated film after the retort treatment, the oxygen permeability ($cm^3/(m^2 \cdot day \cdot atm)$) was measured in an atmosphere of 30° C. and 70% RH using an oxygen permeability measuring device (trade name: OXTRAN-2/20, manufactured by MOCON, Inc.). Further, using a water vapor permeability measuring device (trade name: PERMATRAN-W-3/33, manufactured by MOCON, Inc.), the water vapor permeability ($g/(m^2 \, day)$) was measured in an atmosphere of 40° C. and 90% RH. The measurement results are shown in Table 10. For the gas barrier laminated film after the retort treatment, a test piece was cut into strips with a width of 15 mm, and the lamination strength between the gas barrier film and the CPP film was measured by a universal tester Tensilon RTC-1250 with peeling under T-type and 180° at a peeling speed of 300 m/min. The measurement results are shown in Table 10.

the gas barrier film of Comparative Example 10-1 in which the first surface of the resin base material is made of a polypropylene homopolymer had a lamination strength (T-type peeling) of less than 2 N/15 mm after the retort treatment, thus, sufficient strength was not obtained.

The gas barrier film of the present disclosure stably exhibits an excellent gas barrier property, and exhibits an excellent gas barrier property even after the retort treatment. In addition, the surface condition of the base material film can be easily grasped, the quality can be stabilized even if the oxygen barrier coating is thinned, and the raw material cost can be reduced.

In addition, the gas barrier film of the present disclosure has good printability. Therefore, the surface of the gas barrier film can be easily and beautifully printed.

The gas barrier film of the present disclosure can be suitably used as a packaging material, for example, and can also be suitably used as a packaging material for the boiling treatment and the retort treatment. By using the gas barrier film of the present disclosure as a packaging material, the quality retention of the contents can be improved.

The gas barrier film of the present disclosure can be used for applications other than packaging materials. Applications other than packaging materials include, for example, electronic device-related films, solar cell films, various functional films for fuel cells, substrate films, and the like.

Although the present invention has been described in detail above, the above description is merely an example of the present invention in all respects and does not intend to limit the scope thereof. It is needless to say that various improvements and modifications can be made without departing from the scope of the present invention.

TABLE 10s

| | | resin base material | | | | | | | |
| | | first surface | | | | | | lamination | |
| | | | number of protrusion having a ferret diameter of 8 μm | | | | oxygen permeability | water vapor permeability | strength [N/15 mm] | |
| | type | resin | or more (pieces/mm$^2$) | base layer | inorganic oxide layer | oxygen barrier coating | [$cm^3/(m^2 \cdot day \cdot atm$)] | [$g/(m^2 \cdot day$)] | T type peeling | 180° peeling |
|---|---|---|---|---|---|---|---|---|---|---|
| Examples 10-1 | β3 | polyolefin-based copolymer resin | 15.2 | present | aluminum oxide | polycarboxylic acid polyvalent metal salt coating | 0.2 | 0.9 | >5.0 | >5.0 |
| Comparative Example 10-1 | β8 | polypropylene homopolymer | 11.1 | present | aluminum oxide | polycarboxylic acid polyvalent metal salt coating | 0.5 | 1.5 | 1.8 | 3 |

According to the results described in Table 10, the gas barrier film of 10-1 in which the first surface of the resin base material is made of a polyolefin-based copolymer resin and the density of protrusions with a ferret diameter of 8 μm or more on the first surface of the resin base material is 20 pieces/mm$^2$ or less showed a good oxygen barrier property with an oxygen permeability value of 2 $cm^3/(m^2 \cdot day \cdot atm)$ or less in an atmosphere of 30° C. and 70% RH, and the lamination strength after the retort treatment also was a sufficient value of 2 N/15 mm or more. On the other hand,

What is claimed is:

1. A gas barrier film comprising
   a resin base material,
   an oxygen barrier coating provided on at least one surface side of the resin base material, and
   one or both of a base layer and an inorganic oxide layer provided between the resin base material and the oxygen barrier coating, wherein one surface of the resin base material has a black area ratio of 0.15% or less as measured by the following measuring method <Measuring method>

An arbitrary region of 1281 μm square on one surface of a resin base material is photographed with an optical microscope to acquire a photographed image of 1024×1024 pixels, the photographed image is converted into a monochrome image of 256 gradations using an image analysis software, and the value obtained by subtracting 30 from the most frequent value of the luminance in the monochrome image is set as the threshold, the value less than the threshold is set to black, and the value not less than the threshold is set to white, thus binarizing the luminance, and the ratio of the total area of the black regions having a size of 100 μm² or more in the 1281 μm square region is defined as the black area ratio.

2. The gas barrier film according to claim 1, wherein the resin base material contains an anti-blocking agent.

3. The gas barrier film according to claim 1, wherein the resin base material is made of one selected from polypropylene, polyethylene terephthalate, and nylon.

4. The gas barrier film according to claim 1, wherein the base layer has a thickness of 0.01 to 1 μm.

5. The gas barrier film according to claim 1, wherein the base layer contains an organic polymer as the main component, and the organic polymer contains at least one of a polyacrylic resin, a polyol-based resin, a polyurethane-based resin, a polyamide-based resin, and a reaction product of these resins.

6. The gas barrier film according to claim 1, wherein the inorganic oxide layer has a thickness of 1 to 200 nm.

7. The gas barrier film according to claim 1, wherein the inorganic oxide layer is made of aluminum oxide or silicon oxide.

8. The gas barrier film according to claim 1, wherein the oxygen barrier coating has a thickness of 0.05 to 1 μm.

9. The gas barrier film according to claim 1, wherein the oxygen barrier coating is a coating containing at least one of a metal alkoxide, a hydrolyzate of a metal alkoxide, and a reaction product of a metal alkoxide or a hydrolyzate of a metal alkoxide, and a water-soluble polymer.

10. The gas barrier film according to claim 9, wherein the oxygen barrier coating contains at least one of a silane coupling agent, a hydrolyzate of a silane coupling agent, and a reaction product of a silane coupling agent or a hydrolyzate of a silane coupling agent.

11. The gas barrier film according to claim 1, wherein the oxygen barrier coating contains a carboxylic acid polyvalent metal salt which is a reaction product of a carboxy group of a polycarboxylic acid-based polymer (A) and a polyvalent metal compound (B).

12. A method for producing the gas barrier film of claim 1, comprising measuring the black area ratio on the surface of a resin base material by the following measuring method, and preparing a resin base material having the black area ratio on at least one surface of 0.15% or less as the resin base material, and applying a coating agent to at least one surface side of the resin base material to form at least the oxygen barrier coating:

<Measuring method>

An arbitrary region of 1281 μm square on one surface of a resin base material is photographed with an optical microscope to acquire a photographed image of 1024×1024 pixels, the photographed image is converted into a monochrome image of 256 gradations using an image analysis software, and the value obtained by subtracting 30 from the most frequent value of the luminance in the monochrome image is set as the threshold, the value less than the threshold is set to black, and the value not less than the threshold is set to white, thus binarizing the luminance, and the ratio of the total area of the black regions having a size of 100 μm² or more in the 1281 μm square region is defined as the black area ratio.

13. A gas barrier film comprising a resin base material, an oxygen barrier coating provided on at least one surface side of the resin base material, and one or both of a base layer and an inorganic oxide layer provided between the resin base material and the oxygen barrier coating, wherein the resin base material is a polyolefin-based resin film, and one surface of the resin base material has a black area ratio of 0.15% or less as measured by the following measuring method <Measuring method>

An arbitrary region of 1281 μm square on one surface of a resin base material is photographed with an optical microscope to acquire a photographed image of 1024×1024 pixels, the photographed image is converted into a monochrome image of 256 gradations using an image analysis software, and the value obtained by subtracting 30 from the most frequent value of the luminance in the monochrome image is set as the threshold, the value less than the threshold is set to black, and the value not less than the threshold is set to white, thus binarizing the luminance, and the ratio of the total area of the black regions having a size of 100 μm² or more in the 1281 μm square region is defined as the black area ratio.

14. The gas barrier film according to claim 13, wherein the resin base material contains an anti-blocking agent.

15. The gas barrier film according to claim 13, wherein the base layer has a thickness of 0.01 to 1 μm.

16. The gas barrier film according to claim 13, wherein the base layer contains an organic polymer as the main component, and the organic polymer contains at least one of a polyacrylic resin, a polyol-based resin, a polyurethane-based resin, a polyamide-based resin, and a reaction product of these resins.

17. The gas barrier film according to claim 13, wherein the inorganic oxide layer has a thickness of 1 to 200 nm.

18. The gas barrier film according to claim 13, wherein the inorganic oxide layer is made of aluminum oxide or silicon oxide.

19. The gas barrier film according to claim 13, wherein the oxygen barrier coating has a thickness of 0.05 to 1 μm.

20. The gas barrier film according to claim 13, wherein the oxygen barrier coating is a coating containing at least one of a metal alkoxide, a hydrolyzate of a metal alkoxide, and a reaction product of a metal alkoxide or a hydrolyzate of a metal alkoxide, and a water-soluble polymer.

* * * * *